(12) United States Patent
Flanders et al.

(10) Patent No.: US 9,267,964 B2
(45) Date of Patent: Feb. 23, 2016

(54) ELECTROCHEMICALLY-GROWN NANOWIRES AND USES THEREOF

(71) Applicant: Kansas State University Research Foundation, Manhattan, KS (US)

(72) Inventors: Bret Flanders, Manhattan, KS (US); Govind Paneru, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 14/186,657

(22) Filed: Feb. 21, 2014

(65) Prior Publication Data
US 2014/0173786 A1 Jun. 19, 2014

Related U.S. Application Data

(63) Continuation-in-part of application No. PCT/US2012/051907, filed on Aug. 22, 2012.

(60) Provisional application No. 61/526,618, filed on Aug. 23, 2011.

(51) Int. Cl.
| | | |
|---|---|---|
| G01Q 60/38 | (2010.01) | |
| G01Q 60/40 | (2010.01) | |
| G01Q 70/12 | (2010.01) | |
| B82Y 15/00 | (2011.01) | |
| B82Y 35/00 | (2011.01) | |

(52) U.S. Cl.
CPC .............. *G01Q 60/38* (2013.01); *G01Q 60/40* (2013.01); *G01Q 70/12* (2013.01); *B82Y 15/00* (2013.01); *B82Y 35/00* (2013.01); *Y10S 977/762* (2013.01); *Y10T 428/12389* (2015.01); *Y10T 428/2976* (2015.01)

(58) Field of Classification Search
CPC ........ B82Y 15/00; B82Y 35/00; G01Q 70/12; G01Q 60/38; G01Q 70/10; C25D 1/04; Y10T 428/12389; Y10T 428/2976; Y10S 977/762
USPC .......................... 850/56–59; 205/76; 977/762
See application file for complete search history.

(56) References Cited

U.S. PATENT DOCUMENTS

| | | | |
|---|---|---|---|
| 7,582,975 B1 * | 9/2009 | Kamins ................... | B82Y 10/00 257/414 |
| 8,137,526 B2 * | 3/2012 | Flanders ................... | C25D 1/04 205/76 |

(Continued)

FOREIGN PATENT DOCUMENTS

| | | |
|---|---|---|
| KR | 1020060105848 | 10/2006 |
| WO | 2005114230 | 12/2005 |

OTHER PUBLICATIONS

Thapa, P., et al., "Directional Growth of Polypyrrole and Polythiophene Wires" Applied Physics Letters 94, 033104 (2009).*

(Continued)

*Primary Examiner* — Wyatt Stoffa
(74) *Attorney, Agent, or Firm* — Hovey Williams LLP

(57) ABSTRACT

Nanowire apparatus and methods of using the same are disclosed. The apparatus include nanowires that are attached to and extend from varying substrates and can be used in the manipulation of cells and/or sensing of cellular and subcellular characteristics. The methods include using the apparatus to sense forces exerted by a single cell or using the apparatus to manipulate one or more cells.

9 Claims, 15 Drawing Sheets

(56) References Cited

U.S. PATENT DOCUMENTS

| | | | | |
|---|---|---|---|---|
| 2006/0123628 A1* | 6/2006 | Horiuchi | | B82Y 10/00 29/857 |
| 2007/0237676 A1* | 10/2007 | Colton | | B82Y 35/00 422/68.1 |
| 2007/0285078 A1* | 12/2007 | Kusaka | | B82Y 35/00 324/72 |
| 2008/0000293 A1 | 1/2008 | Kitazawa et al. | | |
| 2009/0000364 A1* | 1/2009 | Yu | | C25D 17/00 73/105 |
| 2009/0032706 A1* | 2/2009 | Prater | | B82Y 35/00 250/307 |
| 2009/0200170 A1* | 8/2009 | Flanders | | C25D 1/04 205/77 |
| 2009/0242405 A1* | 10/2009 | Mayer | | B81C 1/00214 204/435 |
| 2010/0005552 A1* | 1/2010 | Nakayama et al. | | 850/6 |
| 2010/0005553 A1* | 1/2010 | Jin | | B82Y 15/00 850/58 |
| 2010/0089866 A1 | 4/2010 | Prinz et al. | | |
| 2010/0164110 A1* | 7/2010 | Jin | | H01L 21/2855 257/757 |
| 2010/0190407 A1* | 7/2010 | Wei | | B82Y 30/00 445/23 |
| 2010/0205699 A1* | 8/2010 | Tachizaki | | B82Y 15/00 850/47 |
| 2010/0257643 A1* | 10/2010 | Reifenberger | | G01Q 60/38 850/6 |
| 2010/0325073 A1* | 12/2010 | Haick | | B82Y 15/00 706/12 |
| 2012/0018821 A1* | 1/2012 | Beyeler | | G01L 1/148 257/418 |
| 2012/0053320 A1* | 3/2012 | Reguera | | C07K 14/195 530/344 |
| 2012/0111599 A1* | 5/2012 | Roberson | | H01B 1/04 174/107 |
| 2012/0167261 A1* | 6/2012 | Belkin | | B82Y 35/00 850/56 |
| 2013/0115456 A1* | 5/2013 | Wagner | | D01D 5/0015 428/394 |

OTHER PUBLICATIONS

Ozturk, B., et al., "Single-step growth and low resistance interconnecting of gold nanowires" Nanotechnology 18 (2007).*

Das, A., et al., "Non-Lithographic Fabrication of PEDOT nano-wires between fixed Au electrodes" Organic Electronics 7 (2006) 181-187.*

Choi, J., et al., Electrospun PEDOT:PSS/PVP nanofibers as the chemiresistor in chemical vapour sensing, Synthetic Metals 160 (2010) 1415-1421.*

The International Research Report and Written Opinion dated Jan. 22, 2013 in the corresponding PCT/US2012/051907 filed on Aug. 22, 2012.

Thapa, Prem S. "Directional Growth of Metallic and Polymeric Nanowires," Nanotechnology, 2009, vol. 20, IOP Publishing.

Thapa, Prem S. "Forces at Individual Pseudopod-Filament Adhesive Contacts," Applied Physics Letters, Aug. 2011, pp. 093702-093703, vol. 99, Issue 9.

Richardson-Burns, SM "Electrochemical Polymerization of Conducting Polymers in Living Neural Tissue," J. Neural Engineering, Feb. 2, 2007.

* cited by examiner

US 9,267,964 B2

ELECTROCHEMICALLY-GROWN NANOWIRES AND USES THEREOF

CROSS-REFERENCE TO RELATED APPLICATION

This application is a continuation-in-part of International Patent Application PCT/US2012/051907, filed Aug. 22, 2012, which claims the benefit of U.S. Provisional Patent Application No. 61/526,618, filed Aug. 23, 2011, both of which are incorporated by reference herein in their entireties.

STATEMENT REGARDING FEDERALLY SPONSORED RESEARCH OR DEVELOPMENT

This invention was made with government support under grant number PHY-0646966 awarded by the National Science Foundation. The government has certain rights in the invention.

BACKGROUND OF THE INVENTION

1. Field of the Invention

The present invention is directed toward nanowires capable of contacting individual cells, and methods of using the same. The nanowires according to the present invention can effectively and efficiently manipulate single cells and/or sense forces exerted by single cells. These nanowires may be used in a number of applications including, but not limited to, single cell or subcellular contact force sensing, and excision and/or transplantation of single cell to few cellular level tissues.

2. Description of the Prior Art

Several diverse biomedical fields would benefit from devices that can manipulate and/or sense various characteristics of individual cells. Manipulation and sensing various characteristics of individual cells requires devices comparable in size to the cells of interest. For example, detecting the adhesive contact forces exerted by a cell's pseudopod appendage on a substrate requires a sensor comparable in size to this contact site. Despite the importance of pseudopod-substrate adhesive contacts in force transmission and environmental sensing, which influences the direction of migration of leukocytes or breast cancer cells, there have been few measurements and little characterization of pseudopod-substrate adhesive contacts at the single-contact level.

One current technique used for measuring cellular contact forces is the deformable substrate method, which involves observation of cell induced wrinkling or marker displacement of an elastic substrate. However, with this method, the forces at the discrete single adhesive contact sites are not directly measured. Instead, these forces are extracted by a non-trivial modeling effort that correlates the substrate displacement field with the inferred force field and with the discrete contact sites. Another current technique employs the use of an atomic force microscope (AFM) to measure cellular contact forces. However, conventional AFM cantilevers are too bulky to be precisely interfaced with such amorphous and dynamic sub-micron-sized targets and, as a result, have difficulty measuring the forces exerted by single pseudopod substrate adhesive contacts.

Additionally, in other medical fields, there is an absence of devices that can manipulate individual cells. For example, in certain instances, it is beneficial to excise and/or transplant tissue samples at the cellular level. However, conventional scalpels and curettes are too large and bulky to remove surrounding tissue and cells in such procedures. Therefore, there is a need for devices that can effectively and safely manipulate individual cells and/or sense various characteristics of individual cells.

SUMMARY OF THE INVENTION

In one embodiment according to the present invention, there is provided an apparatus, which includes a metal filament and a metallic or polymeric nanowire extending from one end thereof.

In another embodiment according to the present invention, there is provided a hybrid AFM cantilever, which includes an AFM cantilever, at least a portion of which is gold plated, and a metallic or polymeric nanowire extending from the tip of the AFM cantilever.

In yet another embodiment according to the present invention, there is provided a method of measuring cellular forces exerted by a cell, the method includes the steps of (a) providing an apparatus that includes a metal filament and a metallic or polymeric nanowire extending from one end thereof or an apparatus that includes a gold coated electrode and a nanowire extending therefrom, (b) causing a cell to come into contact with the nanowire, the cell causing the nanowire to be displaced from its normal position, (c) imaging the cell in contact with the nanowire during displacement thereof, and (d) measuring the distance that the nanowire is displaced during contact with the cell.

In still another embodiment according to the present invention, there is provided a method of measuring cellular forces exerted by a cell, the method including the steps of (a) providing an apparatus that includes a hybrid AFM cantilever, which includes an AFM cantilever, at least a portion of which is gold plated, and a metallic or polymeric nanowire extending from the tip of the AFM cantilever, (b) causing a cell to come into contact with the hybrid AFM cantilever, the cell causing the AFM hybrid cantilever to be displaced from its normal position, and (c) measuring the distance that the AFM cantilever is displaced during contact with the cell.

In a further embodiment according to the present invention, there is provided a method of manipulating one or more cells, the method including (a) providing an apparatus that includes a metal filament and a metallic or polymeric nanowire extending from one end thereof, and (b) contacting the one or more cells with the nanowire, the one or more cells being in an initial location.

BRIEF DESCRIPTION OF THE DRAWINGS

FIG. 6(*b*) is an optical micrograph of the PEDOT nanowire of FIG. 6(*a*), particularly showing the PEDOT nanowire deflected upward by the pseudopod 37 seconds after contact initiation by the pseudopod, the white dotted curve represents the deflected nanowire shape predicted by cantilever rod theory;

FIG. 6(*c*) is an optical micrograph of the PEDOT nanowire of FIG. 6(*a*), particularly showing the PEDOT nanowire deflected upward by the pseudopod 46 seconds after contact initiation by the pseudopod, the white dotted curve represents the deflected nanowire shape predicted by cantilever rod theory;

FIG. 6(*d*) is an optical micrograph of the PEDOT nanowire of FIG. 6(*a*), particularly showing the PEDOT nanowire deflected upward by the pseudopod 54 seconds after contact initiation by the pseudopod, the white dotted curve represents the deflected nanowire shape predicted by cantilever rod theory;

FIG. 6(*e*) is an optical micrograph of the PEDOT nanowire of FIG. 6(*a*), showing the PEDOT nanowire deflected upward by the pseudopod more than 54 seconds after contact initiation by the pseudopod, the white dotted curve represents the deflected nanowire shape predicted by cantilever rod theory;

FIG. 6(*f*) is an optical micrograph of the PEDOT nanowire of FIG. 6(*a*), particularly showing the PEDOT nanowire 105 seconds after contact initiation by the pseudopod when the PEDOT nanowire is back to its normal position;

FIG. 7(*b*) is an enlarged view of the contact area between the pseudopod and the PEDOT nanowire of the scanning electron micrograph of FIG. 7(*a*);

FIG. 8(*b*) is plot of the AFM cantilever deflection magnitude $\delta_C$ versus vertical position of the AFM head $\Delta z$ for pressing against: (i) a rigid surface (dashed profile), and (ii) a PEDOT nanowire attached to a gold electrode (solid profile);

FIG. 8(*c*) is a plot of the theoretical spring constants of a PEDOT nanowire attached to a gold electrode versus their AFM measured spring constants, the solid line being the best linear fit to the points;

FIG. 8(*d*) is a plot of the nanowire deflection values (open circles) and forces (closed circles) corresponding to the nanowire deflections shown in FIGS. 6(*a*)-(*f*) (except for the 83 seconds data point whose image is not shown in FIG. 6);

FIG. 10(*b*) is a plot of the amplitude versus driving frequency for the PEDOT nanowire of FIG. 10(*a*);

FIG. 12(*b*) is a side-view optical micrograph of a *D. discoideum* cell extending apical pseudopods, particularly showing that one apical pseudopod, indicated by the arrow, is 2.5 μm long and approximately 400 nm wide, the scale bar in the image is 10 μm;

FIG. 13(*b*) is a side-view optical micrograph of the cantilevered PEDOT nanowire of FIG. 13(*a*), particularly showing the PEDOT nanowire deflected upward by a pseudopod 22 seconds after initial contact;

FIG. 13(*c*) is a side-view optical micrograph of the cantilevered PEDOT nanowire of FIG. 13(*a*), particularly showing the PEDOT nanowire deflected upward by a pseudopod 68 seconds after initial contact, the white dotted curve represents the deflected nanowire shape as predicted by cantilever rod theory;

FIG. 13(*d*) is a side-view optical micrograph of the cantilevered PEDOT nanowire of FIG. 13(*a*), particularly showing the PEDOT nanowire deflected upward by a pseudopod 98 seconds after initial contact, the white dotted curve represents the deflected nanowire shape as predicted by cantilever rod theory;

FIG. 13(*e*) is a side-view optical micrograph of the cantilevered PEDOT nanowire of FIG. 13(*a*), particularly showing the PEDOT nanowire deflected upward by a pseudopod 100 seconds after initial contact, the white dotted curve represents the deflected nanowire shape as predicted by cantilever rod theory;

FIG. 13(*f*) is a side-view optical micrograph of the cantilevered PEDOT nanowire of FIG. 13(*a*), particularly showing the PEDOT nanowire 118 seconds after contact initiation by the pseudopod when the PEDOT nanowire is back to its normal position;

FIG. 13(*g*) is a plot of the pseudopod induced deflection of the AFM cantilever of FIG. 13(*a*) (unfilled circles) and force (filled circles) measured during the events depicted in FIGS. 13(*a*)-(*f*), the error bars reflect the propagated uncertainties of $\delta_F$ and $k_{res}$;

FIG. 13(*h*) is a plot of the average of the time-dependent force-profiles of an apical pseudopod (filled circles) and a lateral pseudopod (unfilled circles), the error bars are the standard deviations and propagated uncertainties associated with the force measurements, and the solid and dotted lines are Gaussian fits to these points;

FIG. 14(*b*) is a plot of the AFM cantilever deflection $y_F$ versus the vertical distance moved by the AFM head $\Delta z_{pz}$, the filled circles denote the experimental data, the solid line denoting the theoretical expectation; the inset is an optical micrograph of the hybrid AFM cantilever, in accordance with one embodiment of the present invention, used to obtain this data, the scale bar is 50 μm;

DETAILED DESCRIPTION OF THE PREFERRED EMBODIMENT

The following detailed description of the invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 4:
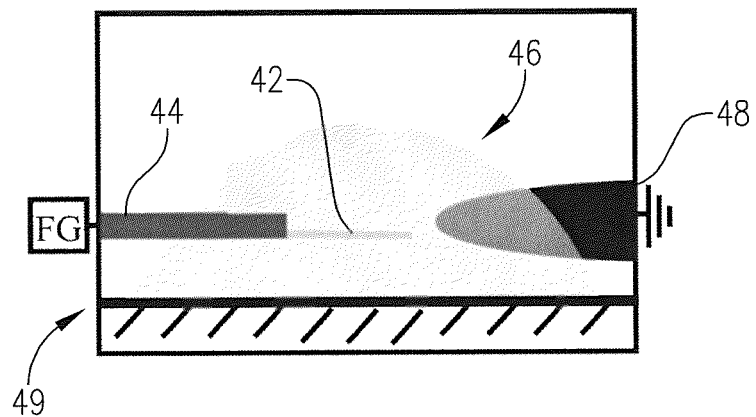
FIG. 4 is a schematic representation of an electrochemical polymerization apparatus used to grow nanowires in accordance with one embodiment of the present invention, "FG" denoting the function generator.

Various embodiments of the present invention concern an apparatus that includes a filament with a nanowire extending from at least one end of the filament. In certain embodiments, the filament has two opposing end regions, where one end region of the filament is attached to the nanowire extending therefrom, and the other end region can be removably connected to a nanowire growth assembly or a 3D translation stage. An exemplary embodiment of a nanowire growth assembly is illustrated in FIG. 4 and can include a filament removably mounted on a 3D stage and removably coupled to a function generator. In one or more embodiments, the filament is attached to a nanowire at one end region and a nanowire growth assembly or a 3D translation stage at the opposing end region, and nothing else in between. For example, in certain embodiments, the filament, or at least a portion thereof, is not lithographically deposited onto a substrate (e.g., a fused silica substrate) or is not attached to any other type of on-chip circuitry. In another embodiment, the apparatus, comprising a filament with a nanowire extending therefrom, is not permanently attached to any substrate, but is capable of being attached to an instrument or tool depending upon the intended use for the apparatus.

The filament can include any material that can grow a nanowire from one end thereof. In one or more embodiments, the filament comprises palladium, platinum, zinc, silver, gold, lead, indium, cobalt, nickel, tungsten, or a combination thereof. In certain embodiments, the filament comprises a biologically inert material, such as, tungsten. In one or more embodiments, one tip of the tungsten filament or other filament can be electro-etched. For example, the bottom tip of an electrically grounded tungsten filament can be electro-etched by repeated dipping (e.g., 10 times per second) in a 10M $NaNO_2$, 6M KOH solution that is grounded while the filament is biased at +4 V over a period of approximately 4 minutes. In certain embodiments, the tip of the tungsten filament or other filaments can have a radii of curvature of about 0.01 μm to about 4 μm, about 0.05 μm to about 3.5 μm, or about 0.1 μm to about 3 μm. Other methods or variations of the above electro-etching method known to those skilled in the art can be used to etch the filament.

In certain embodiments, at least one end of the filament is coated in gold or any other electrically conductive metal or material. In embodiments where one end of the filament is coated in gold, the gold coating can have a thickness of about 10 nm to about 500 nm, about 25 nm to about 400 nm, or about 50 nm to about 300 nm. In another embodiment, the filament can comprise a gold nanowire or a nanowire comprised of any other electrically conductive metal or material. For example, in one embodiment, a nanowire may extend from one end of a gold nanowire, where the gold nanowire functions as the filament.

The nanowire can be a variety of materials that can be grown from at least one end of a filament. In certain embodiments, the nanowires grown from the filament may comprise a metal. For example, the nanowire can include palladium, platinum, zinc, silver, gold, lead, indium, cobalt, nickel, or a combination thereof. In one embodiment, the nanowire may be magnetic, such as, for example, the nanowire may include nickel and/or cobalt.

Figure 1:
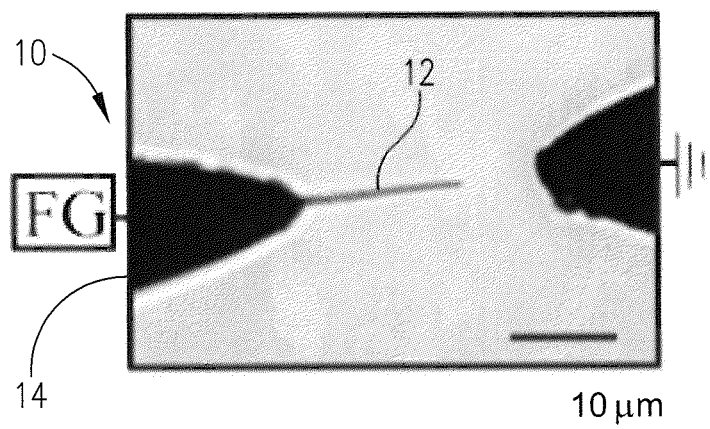
FIG. 1 is an optical micrograph of a poly-3,4-ethylene-dioxy-thiophene (PEDOT) nanowire attached to one end of a tungsten filament in accordance with one embodiment of the present invention, and in addition schematically illustrates an apparatus used to grow the nanowire.

In certain other embodiments, the nanowire comprises a polymer. In one embodiment, the polymer is biocompatible, meaning that it does not compromise the viability of cells it contacts or cells that are proximal to the nanowire. In certain embodiments, the polymer can be electrically conductive comprising, for example, polythiophene and/or polypyrrole. In one or more embodiments, the polymer may include the biocompatible, electrically conductive polymer, poly-3,4-ethylenedioxy-thiophene (PEDOT). FIG. 1 depicts an exemplary apparatus 10 that includes a PEDOT nanowire 12 extending from one end of a tungsten filament 14, which has been electro-etched and coated with gold.

The nanowires can have any length, which can be selected based on the particular application for the nanowire. For example, in certain embodiments, the nanowires can have a length of about 1 μm to about 200 μm, about 3 μm to about 120 μm, or about 5 μm to about 100 μm. Additionally, the nanowires can have a variety of widths, which can be selected based on the particular needs of the apparatus. In one or more embodiments, the width of the nanowire can be less than its length. In certain embodiments, the nanowire has a mean radius of about 30 nm to about 800 nm, about 75 nm to about 650 nm, or about 100 nm to about 450 nm. In one or more embodiments, the nanowires have a radial variation of up to 80% of the mean radius, up to 60% of the mean radius, or up to 50% of the mean radius.

In certain embodiments, it may be beneficial for the nanowire to haves one end larger than the opposing end. For example, the end of the nanowire in contact with the filament has a mean radius $r_1$, and the opposing end has larger mean radius $r_2$. In one or more embodiments, the ratio of mean radius $r_2$ to mean radius $r_1$ is at least 1.1:1 and not more than 50:1, at least 1.3:1 and not more than 40:1, or at least 1.5:1 and not more than 30:1.

In one or more embodiments, the nanowires may be substantially rectilinear. In other embodiments, the nanowires may be curvilinear. In yet another embodiment, the nanowire may include portions that are rectilinear and curvilinear.

Figure 2:
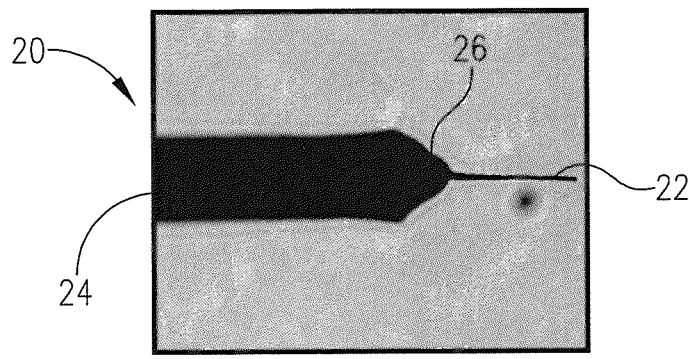
FIG. 2 is an optical micrograph of a PEDOT nanowire attached to one end of an AFM cantilever in accordance with one embodiment of the present invention.

FIG. 2 depicts another embodiment of an apparatus in accordance with the present invention. Specifically, FIG. 2 depicts a hybrid atomic force microscope (AFM) cantilever 20 that includes a PEDOT nanowire 22 attached to one end of an AFM cantilever 24. The nanowire 22 can have the same makeup and physical characteristics as those of the various embodiments of nanowires discussed above. AFM cantilevers are commercially available in a variety of formats, such as, for example, the cantilevers may be fabricated in a variety of sizes and may be coated in gold, platinum, or various magnetic materials. In the embodiment depicted in FIG. 2, the AFM cantilever 24 contains a gold plated tip portion 26, from which the PEDOT nanowire 22 extends. In one or more embodiments, the AFM cantilever can be plated with gold having a gold thickness of about 10 nm to about 500 nm, about 25 nm to about 400 nm, or about 50 nm to about 300 nm.

Figure 3:
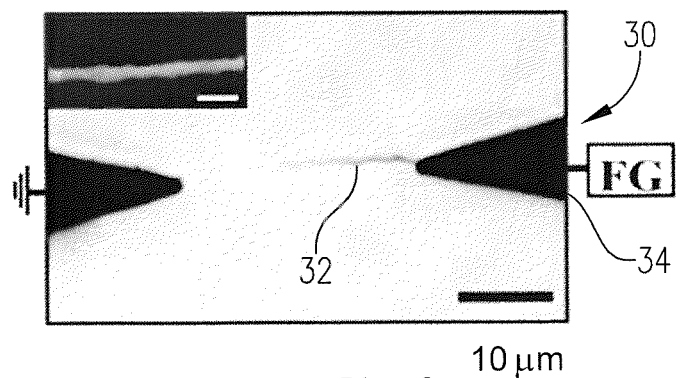
FIG. 3 is an optical micrograph of a PEDOT nanowire attached to a gold electrode in accordance with one embodiment of the present invention and includes an inset showing a scanning electron micrograph of the nanowire, and schematically illustrates an apparatus used to grow the nanowire.

FIG. 3 depicts yet another embodiment of an apparatus 30 in accordance with the present invention. Specifically, FIG. 3 depicts a PEDOT nanowire 32 extending directly from a gold electrode 34. The gold electrode 34 can be any type of electrode and several variations of electrodes are commercially available and can be chosen by one skilled in the art. The apparatus 30 of FIG. 3 is an "on chip" nanowire, meaning that the nanowire 32 is attached to the gold electrode 34, which is physically attached to a glass chip. In contrast, the apparatus 10 of FIG. 1 and the apparatus 20 of FIG. 2 are not "on chip" nanowires, as the filament 14 of FIG. 1 and the AFM cantilever 24 of FIG. 2 are not physically attached to a chip, and therefore, are easily manipulated in three dimensions.

In certain embodiments, the nanowires can be grown from a filament or an AFM cantilever using an electrochemical polymerization technique. For example, in one or more embodiments, a PEDOT nanowire can be grown from one end of an electrically conductive filament or an electrically conductive AFM cantilever, using an electrochemical polymerization technique known as directed electrochemical nanowire assembly, described in U.S. Pat. No. 8,137,526, herein incorporated by reference in its entirety. The directed electrochemical nanowire assembly technique requires that the substrate from which the nanowire grows be electrically conductive, such as, a gold-plated filament or a gold-plated AFM cantilever. In this technique, as depicted in FIG. 4, the AFM cantilever or filament 44 is mounted in a 3D stage and positioned approximately 1 μm above a microscope slide 49. Next, 20 μL of an aqueous solution 46 comprising 0.01M 3,4-ethylene dioxythiophene and 0.02M poly(sodium styrene sulfonate) is placed across an approximately 30 μm gap between the electrically conductive filament end or AFM cantilever tip and another gold counter electrode 48. Next, a square wave voltage signal (+/−3.5 V 10 kHz) can be applied to the electrodes to induce PEDOT nanowire 42 growth via electrochemical polymerization. The square wave voltage signal is turned off once the nanowire 42 has reached the desired length.

Using the directed electrochemical nanowire assembly technique, the width of the PEDOT nanowire 42 (or other type of nanowire) can be controlled. Directed electrochemical nanowire assembly is a type of dendritic solidification, and therefore, the growth rate and the diameter of the nanowires are anti-correlated. Thus, by changing the frequency of the alternating voltage one can control the average diameter of the nanowires. For example, by increasing the frequency of the alternating voltage, the growth rate of the nanowires increases, but the average diameter of the nanowire decreases. Alternatively, by decreasing the frequency of the alternating voltage, the growth rate decreases, but the average diameter of the nanowire increases. To cause these altered growth rates, the frequency can be varied from 1.0 kHz to 100 MHz. After termination of the square wave voltage signal, translation of the microscope stage can pull the solution 46 away from the nanowire 42, thereby straightening the nanowire 42 due to the tension at the air-nanowire-solution contact line. The nanowire 42 can retain this rectilinear profile upon being re-immersed in aqueous solution.

In embodiments where a nanowire includes a metal, the same technique, as described above, can be utilized. However, an aqueous buffer containing the metal cations of interest should be used in place of the aqueous solution used in the above method. For example, in an embodiment with a nanowire that includes indium, an $In(CH_3COO)_3$ aqueous solution could be used. In another embodiment with a nanowire that includes nickel, a $NiSO_4$ aqueous solution could be used. Other aqueous solutions containing metal cations of interest are readily available and one skilled in the art can chose a particular metal cation containing buffer for a specific nanowire of interest. In one or more embodiments, aqueous solutions including salts of Group I and/or Group II metals are not utilized.

In certain embodiments, the directed electrochemical nanowire assembly technique, or other technique, can be used to grow a nanowire from one end of another nanowire. For example in one embodiment, a PEDOT nanowire may be electrochemically grown off of one end of an electrochemically grown gold nanowire mounted on a 3D stage. In this example, the electrochemically gold nanowire is the filament that is attached to the PEDOT nanowire. In another example, a nanowire may be electrochemically grown off of one end of an electrochemically grown nanowire that is attached to an electrode. In yet another example, a nanowire may be electrochemically grown off of one end of an electrochemically grown nanowire that is attached to an AFM cantilever.

Apparatus according to the present invention can be used in a variety of settings where it is desirable to contact a single cell or plurality of cells with a nanowire that is comparable in size to the cells of interest.

For example, various embodiments of the present invention are directed toward methods for determining the forces exerted by a cell. In certain embodiments, cellular forces exerted by a cell can be measured using any of the above mentioned variations of nanowires extending from one end of a filament. For example, in one embodiment, a nanowire extending from one end of a tungsten filament can be utilized to measure the cellular contact forces exerted by a cell.

In another example, various embodiments of the present invention are directed toward determining forces exerted by a cell using a nanowire extending directly from an electrode. A nanowire extended directly from an electrode can have the same physical and chemical properties and characteristics as a nanowire extending from a filament, as described above.

In yet another example, various embodiments of the present invention are directed toward determining forces exerted by a cell using any the above embodiments of the hybrid AFM cantilevers.

In order to measure these cellular forces, the cell and nanowire need to come into contact with one another. Regarding any of the aforementioned nanowire apparatus, in certain embodiments, the nanowire and a solution of cells can be placed on the microscope slide, or in a hybridization chamber, and the nanowire can be kept stationary until a cell comes into contact with it. In other embodiments, specifically regarding hybrid AFM cantilevers and nanowires extending from a filament, a nanowire can be positioned in proximity to a cell of interest. The nanowire could be positioned by movement of the nanowire itself, such as, for example, by placing the nanowire on a 3D stage. There are many commercially available devices for freely moving the nanowire and any one device can be chosen for a specific purpose by one skilled in the art.

Once the cell comes into contact with the nanowire, the nanowire may be displaced from its normal configuration. By "normal configuration" it is meant the nanowire's pre-cellular contact or at rest state in which it is in equilibrium with its surroundings. In certain embodiments, the cell contacts a nanowire by a single pseudopod. In one or more embodiments, the cell exerts a force on a nanowire causing the displacement of the nanowire from its normal configuration to a displaced configuration. For example, in one embodiment, a single pseudopod adhesive contact can exert a force on a nanowire causing the nanowire, or at least a portion thereof, and particularly the free end, to be displaced. In certain embodiments, the nanowire can be displaced by more than 10 µm, by more than 40 µm, or by more than 50 µm. In other embodiments, the nanowire can be displaced by any other distance that is detectable either visually or by some other detection method, such as for example, by an AFM. In one or more embodiments, the forces exerted by a cell on a nanowire can range from about 1 pN to about 100 nN, about 10 pN to about 70 nN, or about 50 pN to about 50 nN.

In order to measure the force exerted by a cell on a nanowire that is attached to a filament, or for a nanowire extending from an electrode, the nanowire is imaged while in contact with the cell and the nanowire displacement observed. Any imaging device can be utilized and a variety of types are commercially available, such as, for example, an inverted microscope for optical imaging. In one or more embodiments, a plurality of images of the cell in contact with a nanowire may be recorded, such as, for example, by recording a movie of the cell-nanowire contact. In certain embodiments, the imaging plane of the imaging device is parallel to the surface of the substrate on which the cell rests, e.g., to image a bottom view of contacts between the cell and the nanowire. In other embodiments, the imaging plane of the imaging device can be perpendicular to the surface on which the cell rests, e.g., to image a side-view of contacts between the apical pseudopod and a nanowire.

Although not required, in certain embodiments, it may be beneficial to use an imaging device to image a cell in contact with a hybrid AFM cantilever during displacement of the hybrid AFM cantilever. In one or more embodiments, imaging of a cell in contact with a hybrid AFM cantilever can enhance the measuring process to make sure the deflection being measured is due to the cell contacting the hybrid cantilever. Imaging the contacts between a cell and a hybrid AFM cantilever can be done in the various ways discussed above. In other embodiments, the contact between a cell and a hybrid AFM cantilever need not be imaged in order to measure the displacement of the hybrid AFM cantilever.

To measure the force that a cell exerts on a nanowire attached to a filament or extending from an electrode, one needs to measure the distance that the nanowire is displaced from its normal configuration by the contact with a cell. Measuring distances in a microscope image is well understood and used readily in various fields. For example, distances in a microscope image can be measured by commercially available software.

In a preferred embodiment, the optical lever-based force sensing apparatus of an AFM can be used to measure the distance that a hybrid AFM cantilever (e.g., at least a portion of the nanowire component of the cantilever) is displaced due to contact with a cell. AFMs containing optical lever-based forcing sensing apparatus are known by one skilled in the art and are commercially available. In one embodiment, one does not have to use an optical lever-based force sensing apparatus of an AFM, and one could image the displacement of the hybrid AFM cantilever and measure this displacement with readily available software.

As discussed in detail in the Examples, from the displacement values of the nanowire caused by contact with a cell, and other values, one can calculate the force applied to the nanowire by the cell. In certain embodiments, to calculate the force, a nanowire is calibrated, which can include determining its spring constant.

In embodiments that include a nanowire extending from an electrode or a nanowire attached to a filament, the spring constant can be determined by at least the following two methods. In one or more embodiments, the spring constant of a nanowire can be measured directly using an AFM. As discussed in detail in Examples 1 and 2, this technique involves pressing the AFM cantilever against a nanowire. In other embodiments, the spring constant of a nanowire can be determined by measuring the resonance frequency of the nanowire. As discussed in detail in Example 2, this technique involves applying a voltage signal to a nanowire so as to cause transverse oscillation of the nanowire.

In embodiments that include a hybrid AFM cantilever, the calibration of the nanowire can include determining the spring constant of the hybrid cantilever. As discussed in detail in Example 3, this technique includes causing the hybrid AFM cantilever to come into contact with a rigid substrate and measuring the distance that the AFM cantilever is displaced during contact with the rigid substrate.

Various other embodiments of the present invention are directed toward a method of manipulating one or more cells using any of the embodiments of a nanowire attached to a filament, described above. In order to manipulate one or more cells, a nanowire must come into contact with those cells. The macroscopic size of the filament allows one to easily control the filament and thereby also control the movement of the nanowire. For example, in one embodiment, the filament can be coupled to a 3D translation stage which can then be manually controlled to move the nanowire attached to the filament towards at least one cell. In another embodiment, the filament can be coupled to a 3D translation stage that can be electronically controlled, for a finer level of control in contacting a cell. Upon contact with the nanowire, the one or more cells may adhere to the nanowire.

In certain embodiments, the cells can form part of a human or animal tissue. In another embodiment, one or more cells can be removed from their initial location. For example, in certain embodiments, a nanowire can be used to remove one or more cells from human or animal tissue. In one embodiment, at least one cell and less than 50 cells, at least one cell and less than 30 cells, or at least one cell and less than 10 cells, are removed from their initial location within the body or tissue sample.

In certain embodiments, one or more cells can be picked up by a nanowire and moved to another location, while still remaining viable. For example, in one embodiment, where one or more cells have adhered to a nanowire, the nanowire can be moved to a location separate from the initial location of the cells and detach, leaving viable cells at this second location. The cells can be transplanted and/or transported to any location based upon the particular purpose for the transplantation/transportation. For example, in one embodiment, one may remove one or more stem cells from one location and transport the stem cells to a separately located muscle tissue.

In one or more embodiments, a nanowire can manipulate a cell by rupturing it. For example, a nanowire can be used to puncture the surface of a cell to thereby cause the cell to rupture. In another example, a nanowire can puncture a cell and while the nanowire is still inside the cell, the nanowire can be vibrated rapidly to cause the cell to break open, thereby destroying the cell.

In certain embodiments, a nanowire can be shifted from its normal position when contacting one or more cells. There is a multitude of ways to shift the position of a nanowire and any particular technique can be chosen by one skilled in the art based on the specific needs of a particular system. For example, external forces could be applied to the nanowire to cause it to shift when contacting one or more cells. This externally applied force can provide a fine tuned level of control when a nanowire is coming into contact with at least one cell or when moving at least one cell. For example, in one embodiment, a nanowire that comprises a magnetic metal can have a magnetic field applied to it to cause the nanowire to shift to at least one other position than its normal position. This magnetic field can provide increased control of the nanowire as it comes into contact with a cell and/or moves a cell. In other embodiments, a magnetic field can be applied to a nanowire that includes a magnetic metal in order to cause the nanowire to rapidly move, thereby causing the contacted cells to rupture. In another embodiment, where the nanowire is attached to a filament at one end, the opposing end of the filament can be coupled to a rotating device to rotate the filament about its longitudinal axis, thereby also rotating the nanowire about this longitudinal axis. In one embodiment, this rotating nanowire can be used to rupture groups of cells or individual cells.

In another embodiment of the invention, the directed electrochemical nanowire assembly (DENA) methodology can be used to grow nano-dendrites or nanowires from simple salt solutions and enable the complete or partial dissolution of the dendrites or nanowires following their growth. In one application, this process may be used to apply fully reconfigurable metallic nano-structures to substrates so that the adhesive, anti-corrosive, or optical properties of the substrate can be modulated. Generally, in this process a pair of electrodes is immersed in an aqueous solution of a metal salt. A voltage signal, such as a square wave voltage signal, is applied to a working electrode while grounding the counter-electrode, which causes growth or dissolution of a metallic dendrite or nanowire from the working electrode. Full reconfiguration of the dendrite or nanowire, that is, growth followed by dissolution, may be induced by variation of either the frequency or the duty cycle of the voltage signal.

The nano-dendrites may comprise any material from which the above-described nanowires may be formed. In certain embodiments, the dendrites are metallic and comprise one or more metals selected from the group consisting of palladium, platinum, zinc, silver, gold, lead, indium, cobalt, nickel, magnesium, or a combination thereof. In these embodiments, the aqueous solution comprises a cation of one of the aforementioned metals and a counterion species.

One practical application of this embodiment of the present invention concerns the production of optimal nanowires and hybrid AFM cantilevers. For example, if in the process of forming a hybrid AFM cantilever the nanowire that is grown is not optimal (e.g., it is too long), the nanowire can be dissolved to the extent that it becomes acceptable, or the nanowire can be completely dissolved and regrown. This ability to reconfigure the nanowires in situ avoids having to remove the cantilever, clean it, possibly re-coat it with more gold, and then re-immerse it to begin the growth process again.

EXAMPLES

The fabrication and use of the apparatus in accordance with certain embodiments of the present invention is discussed in the following Examples. It is to be understood, however, that these Examples are provided by way of illustration and nothing therein should be taken as a limitation upon the overall scope of the invention.

Example 1

On-Chip PEDOT Nanowire Used to Measure Single Pseudopod Contacts

Figure 5:
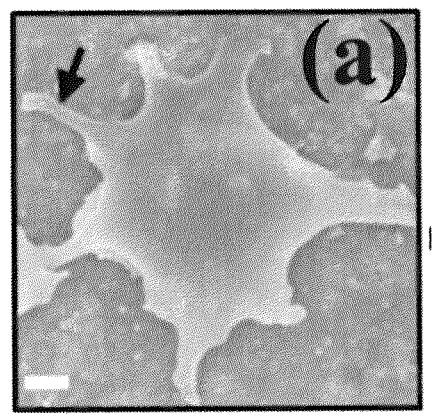
FIG. 5 is a scanning electron micrograph of a fixed *D. discoideum* cell with extending pseudopods and depicts a scale bar of 1 μm.

In this Example, an on-chip cantilever PEDOT nanowire was fabricated and used to measure the forces exerted at single-pseudopod contacts. A typical 3.2 µm long, approximately 400 nm wide, pseudopod is indicated by the arrow in FIG. 5. Direct characterization of an individual pseudopod requires a probe of comparable dimension. To produce the nanowire, a 3 µL aliquot of an aqueous solution containing 0.01 M 3,4-ethylene dioxythiophene and 0.02 M poly(sodium styrene sulfonate) was deposited across the approximately 30 µm gap between a pair of tapered, lithographic Au electrodes. The nanowire 32 in FIG. 3 was produced by applying a ±3.5 V 20 kHz square wave voltage signal across the electrodes to induce nanowire growth from the right electrode 34 at a rate of approximately 5 µm/s. The voltage signal was terminated when the nanowire reached the desired length of approximately 14 µm. The scanning electron micrograph image in the inset of FIG. 3 shows its lengthwise-averaged width to be 320±30 nm. Comparison to FIG. 5 shows nanowire 32 and pseudopod widths to be comparable, as desired. These nanowires are rigidly bonded to the on-chip electrode but not to the glass substrate and, hence, are cantilever structures.

Type KAx3 *D. discoideum* cells were grown at 24 degrees C. in Petri dishes containing HL-5 culturing medium. Prior to transfer to the chips, 1000 µL of the cell-medium suspension was centrifuged for approximately 10 s at $1.34\times10^3$ g. The HL-5 supernatant was replaced with 1000 µl of 12 mM phosphate buffer, followed by gentle shaking for 1 minute. This process was twice-repeated before suspending the cells in 300 µL of phosphate buffer and starving them for 4-6 hours. To prevent evaporation of the cell medium, a 60 µL hybridization chamber (Grace Biolabs) was adhered to the nanowire-laden chip. Before sealing with a transparent lid, 10 µL volumes of cell suspension and phosphate buffer were deposited in the chamber. Typical cell surface densities were $\sim 10^3$ $mm^{-2}$. A waiting time of approximately 20 minutes following cell deposition was required for the cells to settle, to begin migrating, and for a single cell to randomly contact the nanowire.

FIGS. 6(a)-(f) constitute a series of bright-field images (collected on a microscope of 0.75 numerical aperture) of four *D. discoideum* cells migrating randomly on a glass slide. One of these cells contacts the nanowire in FIG. 6(a). This cell deflects the nanowire by exerting pulling force on it in FIG. 6(b)-(e), and releases it in FIG. 6(f). The shape of the pseudopod evolves throughout this event. Approximately $10^2$ such events have been observed. Clearly, these nanowires are flexible enough to deflect visibly upon contact by a foraging cell (yet stiff enough to resist visible thermal motion). In the small deflection approximation, the shape of a cantilever rod of length L and radius r that is bent by a force $F_A$ applied to its free end is described by $$\delta_F(x) = \frac{F_A}{6EI}x^2(3L-x) \quad (1)$$

where $I=\pi r^4/4$ is the area moment of inertia of the solid cylindrical rod, E is Young's modulus of the rod-material, and x denotes position along the rod length with respect to the fixed end. This function was fitted to the deflected nanowire profiles in FIGS. 6(b)-(e), as designated by the white dashed curves overlaid upon these micrographs. As discussed below, no adjustable parameters were used in achieving these fits.

Figure 6:
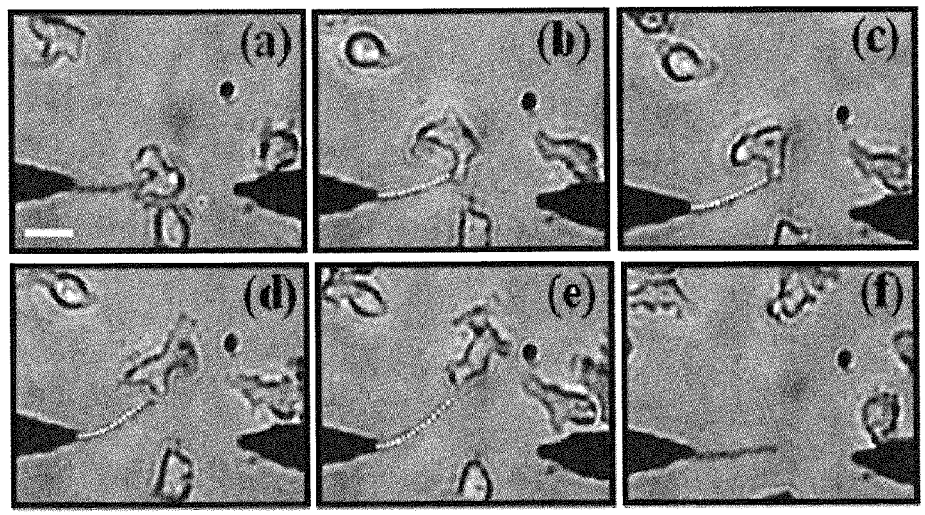
FIG. 6(*a*) is an optical micrograph of a PEDOT nanowire attached to a gold electrode in accordance with one embodiment of the present invention, particularly showing the PEDOT nanowire at its normal position 7 seconds after contact initiation by a pseudopod.
Figure 7:
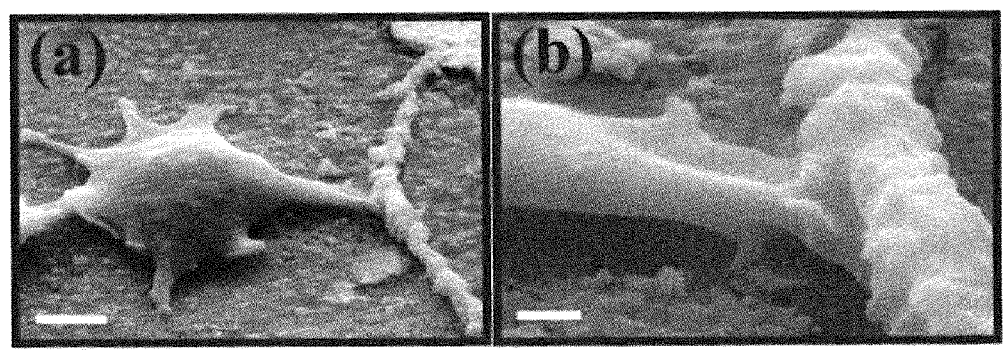
FIG. 7(*a*) is a scanning electron micrograph of a fixed cell, particularly showing a pseudopod in direct contact with a PEDOT nanowire attached to a gold electrode in accordance with one embodiment of the present invention.

FIG. 7(a) shows a scanning electron micrograph of a *D. discoideum* cell that was fixed shortly (5 s) after establishing pseudopod-nanowire contact. An enlarged view of the contact region is shown in FIG. 7(b). The surface of the pseudopod-tip is butted against the left side of the nanowire. The pseudopod does not encompass the nanowire. The two other pseudopod-nanowire contacts that were characterized also exhibited butt-joint contact-structure. Deflection by a pulling-force (as illustrated in FIGS. 6(b)-(e)) that is applied at a simple butt-joint implies adhesive contact between the joined pseudopod and nanowire surfaces. As with better characterized adhesive contacts like focal adhesions and actin foci, adhesion is likely due to numerous trans-membrane cellular adhesion molecules (of undetermined type) that bind the substrate surface.

Figure 8:
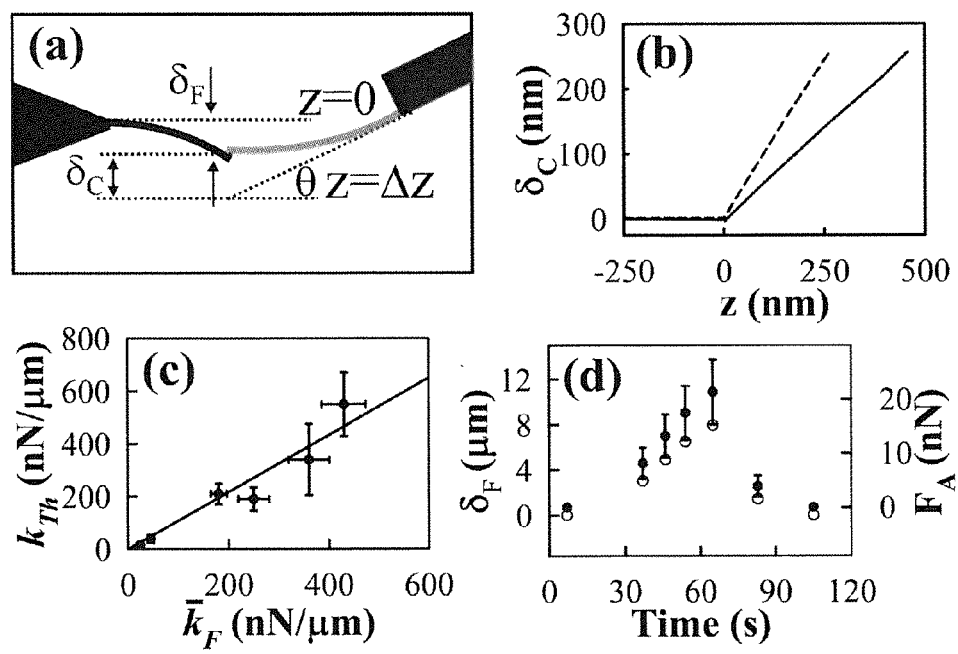
FIG. 8(*a*) is a schematic representation of the use of an AFM to determine the spring constant of a nanowire in accordance with one embodiment of the present invention.

Knowledge of the radius, Young's modulus, and length of a solid, cylindrical cantilever rod permits calculation of its theoretical spring constant in the small deflection approximation: $k_{Th}=3EI/L^3$. To assess how well this simple equation predicts the spring constants of PEDOT nanowires, an AFM was used to directly measure the $k_F$ values of several filaments, permitting comparison of these values to the corresponding $k_{Th}$ values. The AFM (MFP-3D, Asylum Research) was calibrated by pressing its cantilever (NP-0, Veeco) against a hard glass surface to quantify the cantilever deflection-photodiode voltage relationship. The spring constant $k_C$ of this cantilever was determined by the thermal method. Hooke's law then gives the magnitude of the elastic force exerted by the cantilever $F_C$ for deflection $\delta_C$: $F_C=k_C\delta_C$. To measure the spring constant of a PEDOT nanowire $k_F$, the AFM cantilever was pressed against an individual nanowire by lowering the AFM head by distance $\Delta z$, as depicted in FIG. 8(a). This measurement deflects the filament by distance $\delta_F$ and yields a $\delta_C$ vs $\Delta z$ profile (solid line in FIG. 8(b)). The opposing forces exerted by the filament $F_F$ and cantilever $F_C$ are equal in magnitude (Newton's $3^{rd}$ Law); hence, $k_F\delta_F=k_C\delta_C$, where $\delta_F$ is the (unknown) nanowire displacement and $F_F=k_F\delta_F$. $\Delta z$ is related to $\delta_C$ and $\delta_F$ by $\Delta z=\delta_C+\delta_F$, giving $k_F=k_C(\Delta z/\delta_C-1)^{-1}$. The effects of AFM cantilever tilt by angle θ (11 degrees for all cases in this study) and off-end loading of the nanowire are accounted for by corrective factors, yielding $$k_F = k_C(\Delta z/\delta_C - 1)^{-1}\left(\frac{L-\Delta L}{L}\right)^3 \cos^{-2}\theta. \quad (2)$$

ΔL is the distance from the nanowire tip to the loading point as measured via an internal optical microscope in the AFM. The spring constants of six different PEDOT nanowires $k_F$ were obtained by substituting into Equation (2) the corresponding $k_C$, L, ΔL, and δC/Δz values given in Table 1 below. Each nanowire was characterized three times with each of three different cantilevers whose spring constants varied significantly. The averages of these nine determinations for each of the six nanowires are reported in column $\overline{k}_F$.

TABLE 1

Measured properties of six PEDOT nanowires and their associated spring constants (in units of nN/μm)

| r (μm) | L (μm) | ΔL (μm) | $\frac{\delta_c}{\Delta z}$ | $k_c$ | $k_{Th}$ | $k_F$ | $\bar{k}_F$ |
|---|---|---|---|---|---|---|---|
| 0.72 ± 0.08 | 13.24 | 1.3 | 0.59 | 450 | 550 | 490 | 430 |
| 0.64 ± 0.06 | 15.55 | 2.2 | 0.49 | 270 | 210 | 170 | 180 |
| 0.52 ± 0.06 | 12.18 | 1.8 | 0.77 | 110 | 190 | 240 | 250 |
| 0.61 ± 0.12 | 12.38 | 0.5 | 0.57 | 310 | 340 | 380 | 360 |
| 0.28 ± 0.06 | 12.04 | 2.2 | 0.42 | 58 | 16 | 20 | 24 |
| 0.29 ± 0.06 | 9.50 | 0.5 | 0.90 | 55 | 39 | 40 | 45 |

To calculate the $k_{Th}$ values, we approximate the PEDOT nanowire shapes as cylinders having radii equal to the lengthwise averaged radii of the nanowires. These SEM determined values are reported with their standard deviations in Table 1. Also, E was taken to be 2.0 GPa, which is the average of two recent determinations (1.8 GPa and 2.26 GPa) of the PEDOT Young's modulus.

FIG. 8(c) plots $k_{Th}$ vs $\bar{k}_F$. The horizontal error bars denote the standard error associated with the $\bar{k}_F$ determinations; the vertical error bars result from propagation of radial standard deviations and the ±0.03 μm length non-uniformities in the $k_{Th}$ calculations. The solid line, the best-fit to these points, constrained to pass through the origin, has a near-unity slope of 1.08. Hence, the correlation between $k_{Th}$ and $\bar{k}_F$ is strong, indicating that cantilever rod theory provides reasonable predictions of the nanowire spring constants.

FIG. 8(d) shows the nanowire deflection-values (unfilled circles) corresponding to the deflections shown in FIGS. 6(a)-(f) (except for the point at 83 s whose image is not shown in FIG. 6). SEM analysis of this nanowire revealed a 220 nm lengthwise averaged radius and 16.0 μm length. Hence, as demonstrated above, cantilever rod theory ($k_F$=3EI/L$^3$) indicates a spring constant $k_F$ of 2.7±0.7 nN/μm; the sizable uncertainty is expected given the highly nonlinear functionality of $k_F$. Conversion of these $\delta_F$-values to $F_A$-values, via Hooke's law ($F_A$=$\delta_F k_F$), yields the filled circles in FIG. 8(d) (the error bars reflect the propagated uncertainties of $\delta_F$ and $k_F$). As this data and FIG. 6(e) show, $F_A$ reaches 21 nN without breaking contact. The measured force values of 8, 13, 18, and 21 nN reported in FIG. 8(d) (along with I=1.8×10$^{-27}$ m$^4$ and E=2.0 GPa) were used to calculate the parameters $F_A$/6EI in Equation (1) to fully determine the shape functions (white dotted lines) shown in FIGS. 6(b)-(e), respectively. The close agreement with the measured shapes confirms the usefulness of cantilever rod theory for predicting the elastic properties of these PEDOT filaments.

This Example shows that the nanowires according to this invention can be used to characterize submicron cellular contact events.

Example 2

Off-Chip PEDOT Nanowire Used to Measure Single Pseudopod Contacts

Figure 9:
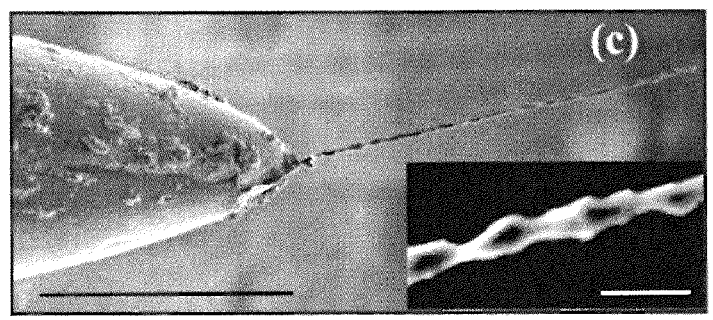
FIG. 9 is a scanning electron micrograph of a PEDOT nanowire attached to one end of a gold plated tungsten filament in accordance with one embodiment of the present invention (scale bar is 15 μm), and an inset showing an enlarged view of the PEDOT nanowire (scale bar is 1 μm)

In this example, PEDOT nanowires were fabricated on the tip of an electro-etched tungsten wire and used to measure single pseudopod contacts. A scanning electron micrograph of a representative PEDOT nanowire attached to a tungsten filament is shown in FIG. 9. These tungsten filament—PEDOT nanowires can provide a probe with a sufficiently high aspect ratio to allow it to cleanly reach a targeted site without forming unintentional, secondary contacts with a cell.

The tungsten filament electro-etching is accomplished by repeatedly submerging the tip of a grounded piece of thin tungsten wire into a basic aqueous solution (10 M NaNO$_2$, 6 M KOH) that is biased at +4 V. This process has been automated and is reproducible by employing a sewing machine to cycle the tungsten filament in and out of the buffer at a rate of 10 times per second. After evaporatively coating an etched wire with approximately 200 nm of Au, it is mounted roughly horizontally in a 3D stage and positioned a few microns above a glass slide on a microscope stage. A 3 μL aliquot of aqueous solution containing 0.01 M 3,4-ethylene dioxythiophene and 0.02 M poly(sodium styrene sulfonate) is deposited across the approximately 30 μm gap between the wire tip and an Ag counter-electrode. FIG. 1 displays an optical micrograph of this arrangement. A PEDOT nanowire is grown from the tungsten tip by applying a ±3.5 V 10 kHz square wave voltage signal across these electrodes. The voltage signal is terminated when the nanowire reaches the desired length. This arrangement is depicted in FIG. 1. Translation of the microscope stage pulls the drop of aqueous solution away from the nanowire, stretching the nanowire lengthwise and straightening it. A scanning electron micrograph of a 32 μm long extracted nanowire is shown in FIG. 9. Its width is approximately 490 nm, comparable to the pseudopod width of FIG. 5. These nanowires are rigidly bonded to the tungsten tip but not to the glass substrate and, hence, are cantilever structures.

The spring constants of 15 different PEDOT nanowires were directly measured by using an AFM, as discussed in Example 1. The measured $k_C$, $\delta_C/\Delta z$, L, and ΔL values were substituted into Equation 2 to obtain the corresponding $k_F$ determinations. Each nanowire was characterized 3 times. The average of the three $k_F$ determinations is denoted $\bar{k}_F$. All quantities required to make these spring constant determinations are reported below in Table 2 (wires 1-15).

TABLE 2

Parameters for the Spring Constant Measurements

| Wire | L (μm) | $\frac{\delta_C}{\Delta z}$ | ΔL (μm) | $k_C$ (nN/μm) | $k_F$ (nN/μm) | $k_F$ (nN/μm) | $\omega_o$ (krad/s) | $r_{res}$ (nm) | $k_{res}$ (nN/μm) |
|---|---|---|---|---|---|---|---|---|---|
| 1 | 7.22 | 0.28 | 0.5 | 58 | 18.9 | 18.0 | 7850 | 202 | 21.0 |
| 2 | 14.58 | 0.34 | 6.56 | 58 | 5.3 | 5.1 | 2292.2 | 241 | 5.1 |
| 3 | 15.08 | 0.22 | 6.56 | 61 | 3.2 | 3.1 | 2009.6 | 226 | 3.6 |
| 4 | 9.66 | 0.41 | 2.2 | 61 | 20.2 | 19.0 | 5149.6 | 238 | 16.7 |
| 5 | 10.66 | 0.45 | 3.9 | 64 | 13.6 | 13.8 | 4207.6 | 237 | 12.2 |
| 6 | 8.80 | 0.41 | 3.06 | 60 | 12.1 | 12.1 | 5338 | 204 | 12.1 |
| 7 | 8.74 | 0.47 | 2.18 | 60 | 23.2 | 23.2 | 6091.6 | 230 | 19.8 |
| 8 | 12.39 | 0.3 | 4.8 | 61 | 6.2 | 6.1 | 2888.8 | 219 | 5.7 |
| 9 | 7.94 | 0.55 | 3 | 65.9 | 20.1 | 21.6 | 6908 | 216 | 20.3 |
| 10 | 10.36 | 0.5 | 3.06 | 60.8 | 22.1 | 21.4 | 5024 | 267 | 21.5 |

TABLE 2-continued

Parameters for the Spring Constant Measurements

| Wire | L (μm) | $\frac{\delta_C}{\Delta z}$ | ΔL (μm) | $k_C$ (nN/μm) | $k_F$ (nN/μm) | $k_F$ (nN/μm) | $\omega_o$ (krad/s) | $r_{res}$ (nm) | $k_{res}$ (nN/μm) |
|---|---|---|---|---|---|---|---|---|---|
| 11 | 9.19 | 0.34 | 2.18 | 60.8 | 14.3 | 14.0 | 5149.6 | 215 | 13.0 |
| 12 | 9.72 | 0.54 | 3.93 | 65.3 | 16.7 | 16.7 | 4961.2 | 232 | 14.8 |
| 13 | 9.36 | 0.49 | 3.5 | 65.3 | 15.6 | 16.3 | 5275.2 | 229 | 15.7 |
| 14 | 10.83 | 0.37 | 4.37 | 62.8 | 8 | 8.2 | 3705.2 | 215 | 7.9 |
| 15 | 8.44 | 0.36 | 2.6 | 61 | 11.7 | 11.0 | 5212.4 | 184 | 8.9 |
| 16 | 12.84 | — | — | — | — | — | 2449.2 | 200 | 3.6 |
| 17 | 17.0 | — | — | — | — | — | 1382 | 198 | 1.5 |
| 18 | 20.0 | — | — | — | — | — | 1118 | 221 | 1.4 |
| 19 | 23.0 | — | — | — | — | — | 942 | 247 | 1.4 |
| 20 | 24.0 | — | — | — | — | — | 816 | 232 | 1.0 |
| 21 | 28.41 | — | — | — | — | — | 439.6 | 176 | 0.2 |
| 22 | 34.0 | — | — | — | — | — | 377 | 216 | 0.3 |
| 23 | 30.0 | — | — | — | — | — | 565 | 252 | 0.7 |
| 24 | 41.0 | — | — | — | — | — | 220 | 183 | 0.07 |
| 25 | 16.73 | — | — | — | — | — | 1758.4 | 244 | 3.5 |

Figure 10:
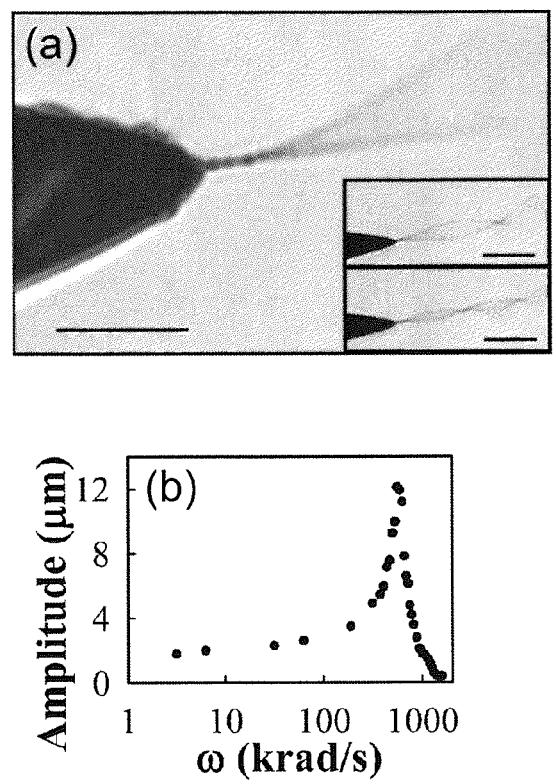
FIG. 10(*a*) is an optical micrograph of a PEDOT nanowire attached to a tungsten filament resonating at its fundamental frequency, with an inset showing optical images of a PEDOT nanowire resonating in its first (upper) and second (lower) harmonic modes, all scale bars are 15 μm.

The spring constants of the PEDOT nanowires were also determined by the resonance-frequency method. To measure the resonance frequency of a PEDOT nanowire, a single cantilever was positioned approximately 10 μm from an Au counter-electrode. A ±20 V alternating voltage-signal of frequency f and a +20 V DC offset are applied to the cantilever while the Au electrode is grounded; polarization forces drive transverse oscillation of the filament at this frequency. A bright field image of a cantilever resonating in its fundamental mode is shown in FIG. 10(a). Images of the vibrating fiber are collected as f is increased in 5 kHz steps. A representative amplitude vs. angular frequency plot is depicted in FIG. 10(b), where the angular frequency ω=2πf. The frequency at which the amplitude reaches its first maximum locates the fundamental resonance frequency $\omega_0$ [565 krad/s in FIG. 10(b)]. Amplitude maxima at frequencies of half the observed resonance frequency were not observed, and the vibrational amplitude was directly proportional to the voltage-amplitude, confirming that the reported $\omega_0$-values are fundamental frequencies. The resonances of the tungsten filament are well-below those of the cantilever and, hence, do not complicate these measurements. The spring constant $k_{res}$ of a radially uniform and solid cantilevered rod of length L depends on $\omega_0$ as $$k_{res} = 0.08 \frac{\pi \rho_m^2}{E} (\omega_0)^4 L^5. \quad (3)$$

Figure 11:
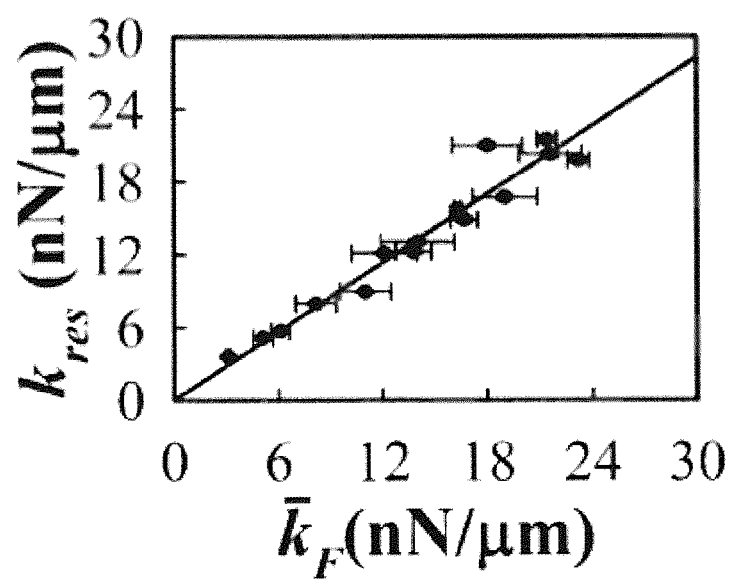
FIG. 11 is a plot of the resonance-based spring constant determinations versus those measured by AFM in Example 2 of the present application.

FIG. 10(a) shows a PEDOT nanowire resonating in its fundamental mode at 90 kHz. (It also resonates in its harmonic modes, as the insets show, demonstrating its strong elastic character). FIG. 10(b) is the amplitude versus frequency plot for the nanowire of FIG. 10(a), indicating a fundamental resonance frequency $\omega_0$ of 565×10³ rad s⁻¹. By substituting this $\omega_0$ value into Equation 3, we obtain a prediction of its spring constant $k_{res}$ of 7.0×10⁻⁴ N/m. In calculating this result, 2.0 GPa was used for the PEDOT Young's modulus E and a mass density $\rho_m$ of 1500 kg m⁻³ was used. By using Equation 3 it is implicitly assumed that a radially non-uniform PEDOT nanowire of length L both resonates and bends like a hypothetical PEDOT nanowire of a constant radius (and length L). This relation is not generally true of structurally non-uniform nanowires. Therefore, in FIG. 11, the extent to which the resonance-based determinations are accurate was assessed by plotting the measured $k_{res}$ values for 15 fibers against their measured $k_F$ values. All parameters required to attain these $k_{res}$ values are listed in Table 2 (Fibers 1-15). These data are best-fit by a line having a near unity slope of 0.95. It is clear that the $k_{res}$-values predict the spring constants of the PEDOT cantilevers with reasonable accuracy; moreover, in the small k range (~4 nN μm⁻¹) used in the cellular force application of the present Example, the agreement is excellent. The resonance frequency calibration method, though approximate, is sufficiently accurate to justify forgoing the somewhat laborious AFM method. Nanowires 16-24 in Table 2, several of which were too compliant for the AFM method, were characterized in this manner.

Type KAx3 *D. discoideum* cells were prepared as described in Example 1 and were deposited in the side-view imaging chamber described below. A waiting time of approximately 20 minutes following cell deposition was required for the cells to settle and begin migrating on the surfaces of the chamber.

Figure 12:
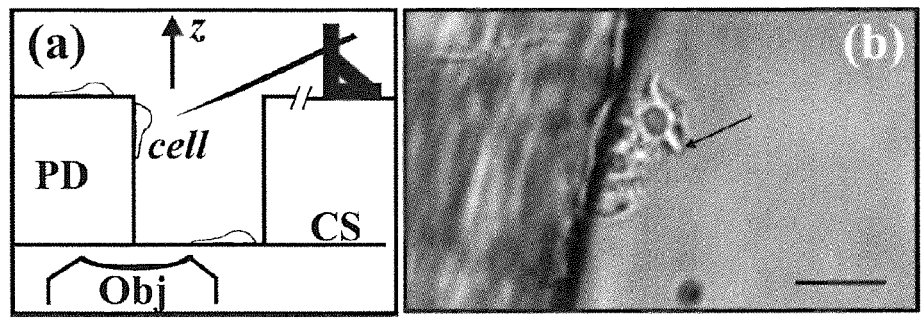
FIG. 12(*a*) is a schematic representation of a side-view imaging apparatus depicting a Petri dish (PD), cover-slip (CS), and a microscope objective (Obj) in accordance with one embodiment of the present invention.

To facilitate investigation of apical pseudopods, which are important for amoeboid migration through 3D matrices, cells were visualized in profile so that the size, shape and cellular location of the pseudopod-nanowire contact could be clearly observed. This mode requires that the imaging plane of the microscope be perpendicular to the substrate on which the cell crawls. The set-up for realizing this perspective is diagrammed in FIG. 12(a). Briefly, a hole was bored in the base of a Petri dish (Fisherbrand) using a 7/32" drill bit at 990 rpm; these parameters minimized lip and sidewall roughness (~3 μm). A cover-slip was cemented to the underside of the dish to seal the hole. *D. discoideum* cells were cultured and introduced to the chamber at cell surface densities of ~10³ mm⁻². The dish was mounted on the stage of an inverted microscope (Leica IRB) for optical imaging, primarily with a 63× water immersion objective of 0.90 numerical aperture. Side-view imaging of the cells was accomplished by focusing the microscope on those migrating on the sidewalls of the hole. A typical side-view image of a *D. discoideum* cell is shown in FIG. 12(b). The arrow points to an apical pseudopod.

FIGS. 13(a)-(f) constitute a series of side-view images of a *D. discoideum* cell migrating on the vertical side-wall. An apical pseudopod adheres to the tip of a nanowire in FIG. 13(a), deflects it by exerting pulling force on it in FIGS. 13(b)-(d), and releases it in FIG. 13(e). These images depict a typical apical pseudopod-nanowire deflection event, where the cantilever represents a secondary substrate. The measured deflection $z_F(L)$ of the nanowire is extracted from these images by finding the distance between the tip of the deflected and un-deflected nanowire. The shape of the pseudopod evolves throughout this event.

Figure 13:
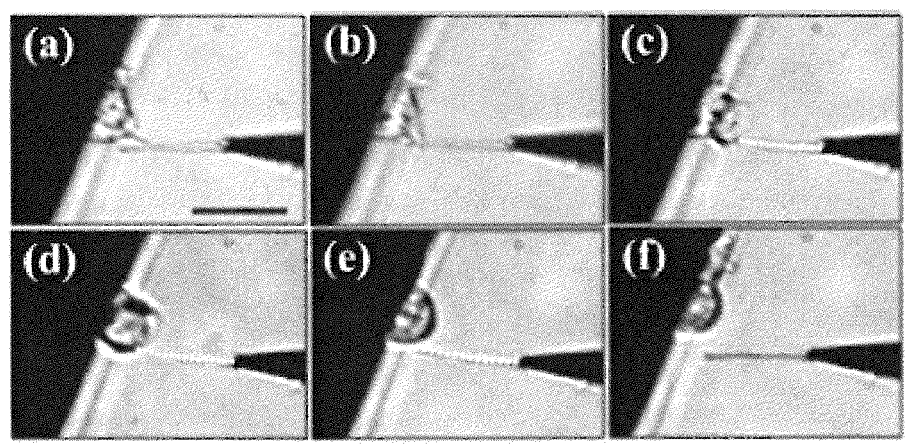
FIG. 13(*a*) is a side-view optical micrograph of a cantilevered PEDOT nanowire attached to a tungsten filament in its normal position after contact initiation with a pseudopod, in accordance with one embodiment of the present invention.
Figure 13:
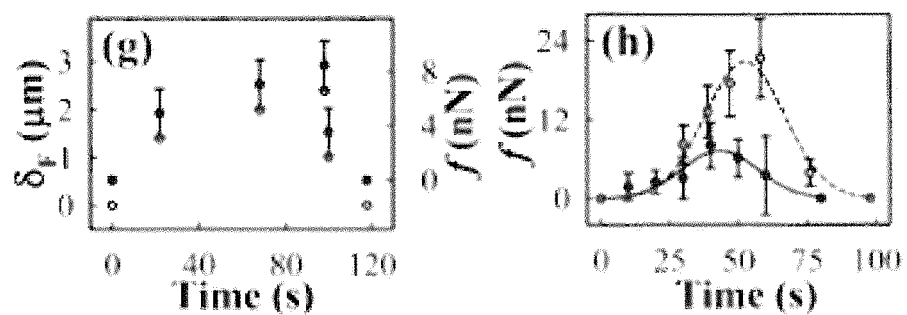

FIG. 13(g) shows the nanowire deflection values $z_F(L)$ (unfilled circles) corresponding to the apical pseudopod deflection events of FIGS. 13(a)-(f). This nanowire, wire 16 in Table 2, was found to have a spring constant $k_{res}$ of 3.5±0.3 nN/μm. Conversion of the $z_F$-values to f-values via Hooke's law ($f=z_F k_{res}$) yields the filled circles in FIG. 13(g). (The error bars reflect the propagated uncertainties of $z_F$ and $k_{res}$). These data show f reaches 8.5 nN without breaking contact.

Six apical pseudopod-induced deflection events were observed in this Example. Defining time-zero of each profile to be the moment at which pseudopod-nanowire contact was initiated, the six time-dependent force profiles were averaged together to obtain a generalized description of a typical nanowire-deflection event. The filled circles in FIG. 13(h) depict this average force profile. The error bars are the standard deviations, and the solid line is a Gaussian fit to these points, having a peak of 7.6 nN positioned 43 s after contact initiation. For comparison, the unfilled circles depict a time-dependent force profile due to a laterally directed-pseudopod, characterized in Example 1 (FIG. 8(d)). The dashed line is a Gaussian fit to the points, having a peak at 20.8 nN positioned 52 s after contact initiation. These data indicate that forces exerted at apical pseudopod-substrate contacts are of the same order of magnitude and of comparable duration to those by lateral pseudopods.

This Example thoroughly illustrates the viability of using nanowires attached to filaments as long reach force sensors for resolving dynamical forces that cells exert at sub-micron sized adhesive contacts.

Example 3

Hybrid AFM Cantilevers

In this Example, a methodology for growing PEDOT nanowires directly from the tips of conventional AFM cantilevers is provided. These hybrid AFM cantilevers increase the reach of the bulky conventional AFM-cantilevers, permitting the study of submicron-sized biological targets, such as the individual adhesive contact sites on single cells.

A typical long-reach cantilever is shown in FIG. 2. This hybrid structure is composed of a PEDOT nanowire 22 bonded to the tip 26 of an AFM cantilever 24 (Veeco MESP). The spring constant of the bare AFM cantilever (i.e. without the PEDOT nanowire) is 2.36 N m$^{-1}$. Directed electrochemical nanowire assembly was used to grow the PEDOT fibers from the AFM cantilevers. The set-up for doing so is depicted in FIG. 4 and described above. The PEDOT nanowire of FIG. 2 has a length of 50.7 μm, providing a significant, high aspect ratio extension to the AFM cantilever. The spring constant of this cantilevered PEDOT nanowire alone (i.e. not the cantilever-fiber combination) is 0.0019 N m$^{-1}$.

Figure 14:
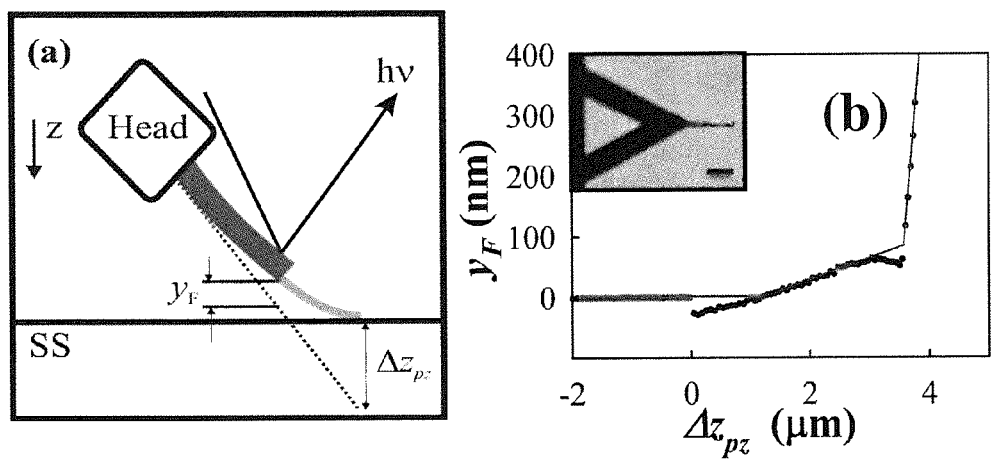
FIG. 14(*a*) is a schematic diagram showing the optical lever-based detection of a hybrid AFM cantilever deflection in accordance with one embodiment of the present invention, "SS" denoting the sample stage, "Head" denoting the AFM head, and "hv" denoting the laser beam.

The hybrid cantilever of FIG. 2 can be used for the precise and accurate monitoring of forces applied at the remote tip of the PEDOT nanowire by measuring the resulting deflection of a laser beam that reflects off of the AFM cantilever. In order to apply the optical-lever technology of an AFM to the hybrid cantilevers, deflection of the PEDOT nanowire-tip should result in a detectable deflection of the AFM cantilever or, equivalently, the laser beam spot on a 4-quadrant photodiode. FIG. 14(a) depicts the experimental configuration that was used to test for this capability. The tip of the PEDOT nanowire was pressed against a hard surface by lowering the piezo-controlled AFM head towards the sample stage (SS). The position of the head $\Delta z_{pz}$ that corresponds to the PEDOT tip being in initial contact with the sample stage was $\Delta z_{pz}=0$ μm. As the piezo was extended, the surface exerted a force f on the entire hybrid cantilever. In turn, this force caused the first segment of the hybrid cantilever—the AFM cantilever—to deflect upwards. The amplitude of this deflection is denoted $y_F$ and, for a pre-calibrated AFM cantilever, was measured internally in the AFM head via the optical-lever based deflection sensor.

A conventional, single-stage AFM cantilever will exhibit a $y_F$ versus $\Delta z_{pz}$ plot that has a single linear section with a slope of unity. This observation reflects the fact that the sample stage is pushing directly on the tip of the AFM cantilever that, in turn, is being directly monitored by the optical-lever-based deflection sensor. Hence, the distance that the stage moves $\Delta z_{pz}$ equals the distance that the AFM cantilever is deflected, giving the $y_F$ versus $\Delta z_{pz}$ plot a unity slope. In contrast, the hybrid (or two stage) cantilevers reported in this Example are expected to exhibit a $y_F$ versus $\Delta z_{pz}$ plot that is bilinear, having one linear section at small $\Delta z_{pz}$ values with a sub-unity slope, followed by a second linear section having unity-slope. When the hybrid cantilever was brought into contact with the sample stage, as illustrated in FIG. 14(a), the first contact occurred between the PEDOT tip and the surface. The distance that the head moved $\Delta z_{pz}$ equaled the distance that the PEDOT tip moved, but these distances exceeded the distance that the AFM cantilever was deflected, which is denoted $y_F$ in FIG. 14(a). Hence, the first linear section of FIG. 14(b) has a sub-unity slope. However, eventually the stage makes contact with the AFM tip. From this point on, the distance that the stage moved equaled the distance that the AFM cantilever was deflected, and the slope of this latter section of the $y_F$ versus $\Delta z_{pz}$ has a unity slope, as discussed above for the single stage AFM cantilever.

The solid line in FIG. 14(b) depicts the theoretical expectation described above for the $y_F$ versus $\Delta z_{pz}$ of a composite cantilever. The filled circles in FIG. 14(b) denote the measured $y_F$ versus $\Delta z_{pz}$ values for the particular hybrid AFM cantilever shown in the inset. There is reasonable agreement between the theoretical and experimental plots. The discrepancy around $\Delta z_{pz}<1$ μm suggests the presence of a small amount of electrostatic attraction between the PEDOT tip and the sample stage. The second discrepancy at $\Delta z_{pz}\sim 3.8$ μm suggests that the small deflection approximation (that was used to obtain the theoretical profiles) breaks down when the PEDOT nanowire is maximally deflected. The observation of an initial linear profile of sub-unity slope that transitions into a second linear segment of unity slope clearly demonstrates that the hybrid AFM cantilevers function essentially as expected.

In order to use these hybrid AFM cantilevers to measure forces exerted by a cell, the hybrid cantilevers are calibrated by measuring their spring constants. As discussed above, to measure the spring constant of a hybrid AFM cantilever, the cantilever is pressed against a rigid surface by moving the AFM head a known distance (a distance that is measured by the AFM). The AFM optically measures the deflection of the AFM cantilever as a photodiode voltage signal. Plotting the photodiode voltage signal against the distance the stage moves allows for conversion of the photodiode voltage signal to an AFM cantilever deflection value, and thus, the photodiode is calibrated. Plotting the AFM cantilever deflection value against the distance the AFM head has moved allows for calibration of the hybrid AFM cantilever. Because this is a hybrid cantilever, the plot will be bilinear. It can be determined that the slope of the middle linear portion of the graph provides a conversion factor between the AFM cantilever deflection and hybrid AFM cantilever deflection. This conversion factor/slope is directly proportional to the inverse of the spring constant of the hybrid AFM cantilever. Along with other independently known quantities, the spring constant of the hybrid AFM cantilever can be determined. Once the spring constant is known, force measurements are made. For example, a cell contacts the nanowire portion of the hybrid AFM cantilever and applies a force, causing the hybrid cantilever to deflect. The AFM measured AFM cantilever deflection value can be converted to a hybrid AFM cantilever deflection value by multiplying it by the aforementioned conversion factor. Multiplying this hybrid AFM cantilever deflection value by the measured spring constant yields the applied force.

Figure 15:
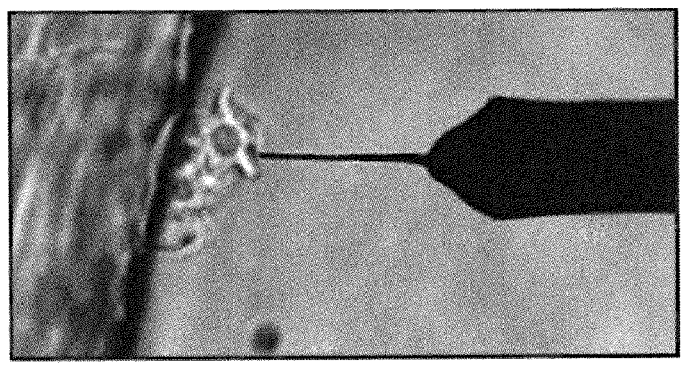
FIG. 15 is a prophetic composite image illustrating the cellular force sensing application of the hybrid AFM cantilever in accordance with one embodiment of the present invention.

These cantilevers enable the adhesion force dynamics of individual adhesive contacts of biological cells to be directly measured, providing needed new insights into their adhesion and migration behaviors. In FIG. 15, the hybrid cantilever is positioned adjacent to a pseudopod containing cell. The cell is in the process of extending an approximately 1 μm sized pseudopod from its apical surface. Once contact between the nanowire and the pseudopod occurs, there is a high probability that the cell will activate its adhesive patch in order to adhere to the nanowire. Subsequently, the forces that the cell exerts at this contact are monitored by the optical-lever based force sensing apparatus of the AFM. It is notable that the 50.7 μm reach of this PEDOT fiber avoids visual obstruction of the contact site by the bulky AFM cantilever, while the submicron width of the nanowire permits its precise interfacing with micron or sub-micron sized cellular targets, such as this pseudopod.

Example 4

Manipulation of Single Cells

Figure 16:
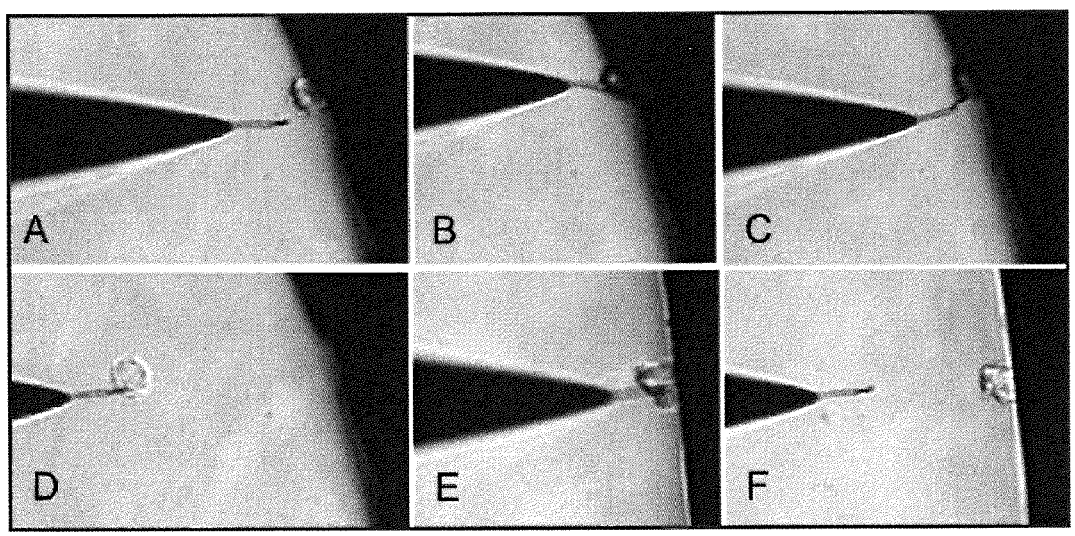
FIG. 16(a) is an optical micrograph of a PEDOT nanowire attached to one end of a tungsten filament as the nanowire moves toward one *D. discoideum* cell in accordance with one embodiment of the present invention.
FIG. 16(b) is an optical micrograph of the nanowire and cell of FIG. 16(a), particularly showing the deflection of the nanowire as it contacts the cell.
FIG. 16(c) is an optical micrograph of the nanowire and cell of FIG. 16(a), particularly showing the deflection of the nanowire as the cell adheres to the nanowire.
FIG. 16(d) is an optical micrograph of the nanowire and cell of FIG. 16(a), particularly showing that the nanowire has moved the cell from its initial position.
FIG. 16(e) is an optical micrograph of the nanowire and cell of FIG. 16(a), particularly showing that the nanowire has moved the cell back to near its initial position.
FIG. 16(f) is an optical micrograph of the nanowire cell of FIG. 16(a), particularly showing the nanowire detached from the cell upon depositing the cell in its position as shown in FIG. 16(e)

In this Example, a PEDOT nanowire attached to a tungsten filament was used to manipulate a single cell. Specifically, this PEDOT nanowire was used to move a cell from one location and place it in another location. An aliquot of *D. discoideum* (Type KAx3) cells was placed in a Petri dish that was on a microscope stage for side viewing, as discussed in Example 2. A 3D translation stage was bolted to an optical table that was elevated to match the approximate height of the microscope stage. The tungsten filament was attached to the 3D translation stage to thereby allow for the manual control of the PEDOT nanowire. A video captured the event. FIGS. 16(a)-(f) depict the sequential major movements of the PEDOT nanowire and the cell. In FIG. 16(a), the PEDOT nanowire approaches the cell in its initial position. FIG. 16(b) shows the PEDOT nanowire contacting the cell and, in an effort to pick up the cell, the nanowire exerts a force on the cell, as evidenced by the bending of the PEDOT nanowire from its normal position of FIG. 16(a). In FIG. 16(c), the PEDOT nanowire is bending in the opposite direction as the cell is being pulled off from its initial position. FIG. 16(d) shows that the cell has been moved from its initial position while attached to the PEDOT nanowire. In FIG. 16(e), the PEDOT nanowire moves the cell back to near its initial position, and in FIG. 16(f), the PEDOT nanowire detaches from the cell. The cell remained viable after these contacts and movement with the nanowire.

This example illustrates that the nanowires contemplated by the present invention can be used to manipulate cells by moving them from one location and placing them at another location. Although only one type of cell was used in this example, this data proves the success of this technique, which can be readily applied to any type of cell, such as human cells.

Example 5

Reconfiguration of Dendritic Gold

In this Example, the directed electrochemical nanowire assembly (DENA) methodology, which is a technique for growing single crystalline metallic nanowires and nano-dendrites from simple salt solutions, is extended to enable the complete dissolution of the metallic dendrites following their growth. The experimental parameters that control this process are the frequency and the duty cycle of the alternating voltage signal that initiates electrochemical dendritic growth. Cyclic voltammetric and Raman measurements imply that the reconfiguration of dendritic gold occurs by way of the same interfacial reduction and oxidation mechanisms as bulk gold. The following Example illustrates how the experimental parameters (frequency and duty cycle) induce reconfiguration by controlling the rates at which reduction, oxidation, and $Au^{III}Cl_4^-$ diffusion take place. This capability is significant because in making dendritic solidification a reconfigurable process, a means has been established of applying fully reconfigurable metallic nano-structures to substrates; in turn, this capability could potentially enable the smart modulation of the adhesive, anti-corrosive, or optical properties of the substrate.

Materials that are capable of high dynamic range structural reconfiguration could potentially be used to confer hydrophobic, lipophobic, and anti-corrosive character to substrates in a regenerative manner. Structural reconfiguration is also important for man-made smart materials that adapt advantageously to environmental changes. Cuttlefish-skin and photosynthetic corals are naturally occurring, oft-cited examples of such materials. As such, reconfigurability-by-design is an important strategy in modern materials science.

The synthesis of specialized building blocks is a widely used strategy for developing reconfigurable materials. Regan and co-workers have synthesized modular peptides that assemble in solution into smart gels. These gels, having pore-sizes sufficient to trap 26 kDa proteins, undergo complete, salinity-dependent dissolution (i.e. cargo-release) and reformation. T. Z. Grove, C. O. Osuji, J. D. Forster, E. R. Dufresne and L. Regan, *J. Am. Chem. Soc.*, 2010, 132, 14024-14026. Pine and co-workers have designed quasi-monopolar magnets that self-assemble into aggregates with reproducible configurations. These assemblies can be fully disassembled or re-assembled by controlling the external magnetic field or the salinity of the surrounding solution. S. Sacanna, L. Rossi and D. J. Pine, *J. Am. Chem. Soc.*, 2012, 134, 6112-6115. The basic strategy of these approaches is to produce a specialized building block that switches its character in response to a changing external field, inducing reconfiguration of the assemblies. However, in naturally occurring environments such as oceans or rivers, one would not attempt to concentrate the waters with synthetic building blocks. Instead, it would be advantageous to control the assembly and disassembly processes of more generic building blocks, such as the components of the salts that are already extant. One could then envision producing nanostructured coatings on the surfaces of, say, underwater metrological apparatus in order to provide corrosion, reflectivity, or adhesion control that could be regenerated as needed.

As a step towards this end, the present work extends the DENA methodology to enable the on-command growth and dissolution of arrays of metallic dendrites on conducting surfaces that are immersed in salty solutions. DENA is a type of dendritic solidification, a widely occurring process that produces crystals having the distinctive dendritic shape observed at the hexagonal points of snowflakes. In general, dendritic solidification occurs when the growth rate of a crystal limited by the diffusion of the building blocks, usually atoms or molecules, through a bulk medium to the solidification front. Spatio-temporal fluctuations in building block deposition rate create sharp protrusions on the solidification front. With further growth, the Mullins-Sekerka instability tends to enhance the growth rate and reduce the tip-radius, while the Gibbs-Thomson effect tends to retard the growth rate and fatten the tip. The result is a dendrite that grows steadily with a fixed tip size. Growth is in the direction of maximum surface tension; side-branches, induced by fluctuations in the deposition rate, grow in crystallographic directions that are commensurate with the main branch. In addition to bulk diffusion, DENA also depends on the electrochemical oxidation and reduction of metal atoms at the crystal-solution interface. Therefore, in order to understand how the dendritic reconfiguration process occurs, both the interfacial chemical steps and the bulk diffusive process must be taken into account.

Gold dendrites are the focus of this Example because the electrochemistry of bulk gold is well-characterized. However, this methodology could be extended to any of the materials previously discussed. The chemical steps underlying the dissolution of gold in chloride-rich, aqueous solutions are shown in reaction scheme (1):

  (1a)

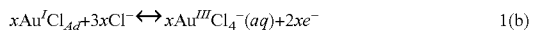  (1b)

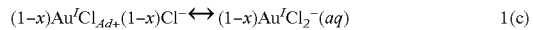  (1c)

where the superscripts denote the oxidation states of Au, and x is the fraction of $Au^I$ moiety that is oxidized to $Au^{III}Cl_4^-$. Essentially, this mechanism says that the electro-dissolution of bulk gold occurs when an $Au^0$ atom from the solid matrix coordinates with a $Cl^-$ atom from the solution to form the adsorbate $Au^I Cl_{Ad}$. The solid $Au^0$ atom is oxidized to $Au^1$ in this step [1(a)]. Subsequent chloride binding and oxidation yields the dissolved products $Au^{III}Cl_4^-(aq)$ [1(b)] and $Au^I Cl_2^-(aq)$ [1(c)]. The chemical steps underlying the deposition of $Au^{(0)}$ are shown in reaction scheme (2) as follows:

  (2a)

  (2b)

These reactions imply that the electro-deposition of gold occurs when a solvated $Au^{III}Cl_4^-$ species [2(a)] or $Au^I Cl^-$ species [2(b)] arrives at the electrode which then reduces the $Au^{III}$ or $Au^I$ moieties to $Au^{(0)}$.

A key question regards the extent to which these processes that occur with bulk gold under DC biases accurately describe the interfacial chemistry of dendritic gold under the AC voltages that the DENA method employs. This information allows us to take the next step of developing a theoretical model for how these interfacial chemical mechanisms act in conjunction with the diffusion of $Au^{III}Cl_4^-$ through the bulk solution to enable dendritic reconfiguration. This theory indicates that the methodology functions by attaining independent control over the joining and leaving rates of atoms to the crystal, thus providing a basis for applying fully reconfigurable metallic nano-structures to substrates. Because this methodology relies on the aqueous electrochemistry of simple salts—not just gold chloride—this approach could potentially be applied in oceanic environments. As such, it has the potential to provide sustainable routes to coatings for corrosion, reflectivity, and adhesion control at immersed surfaces.

Experimental Design

Figure 17:
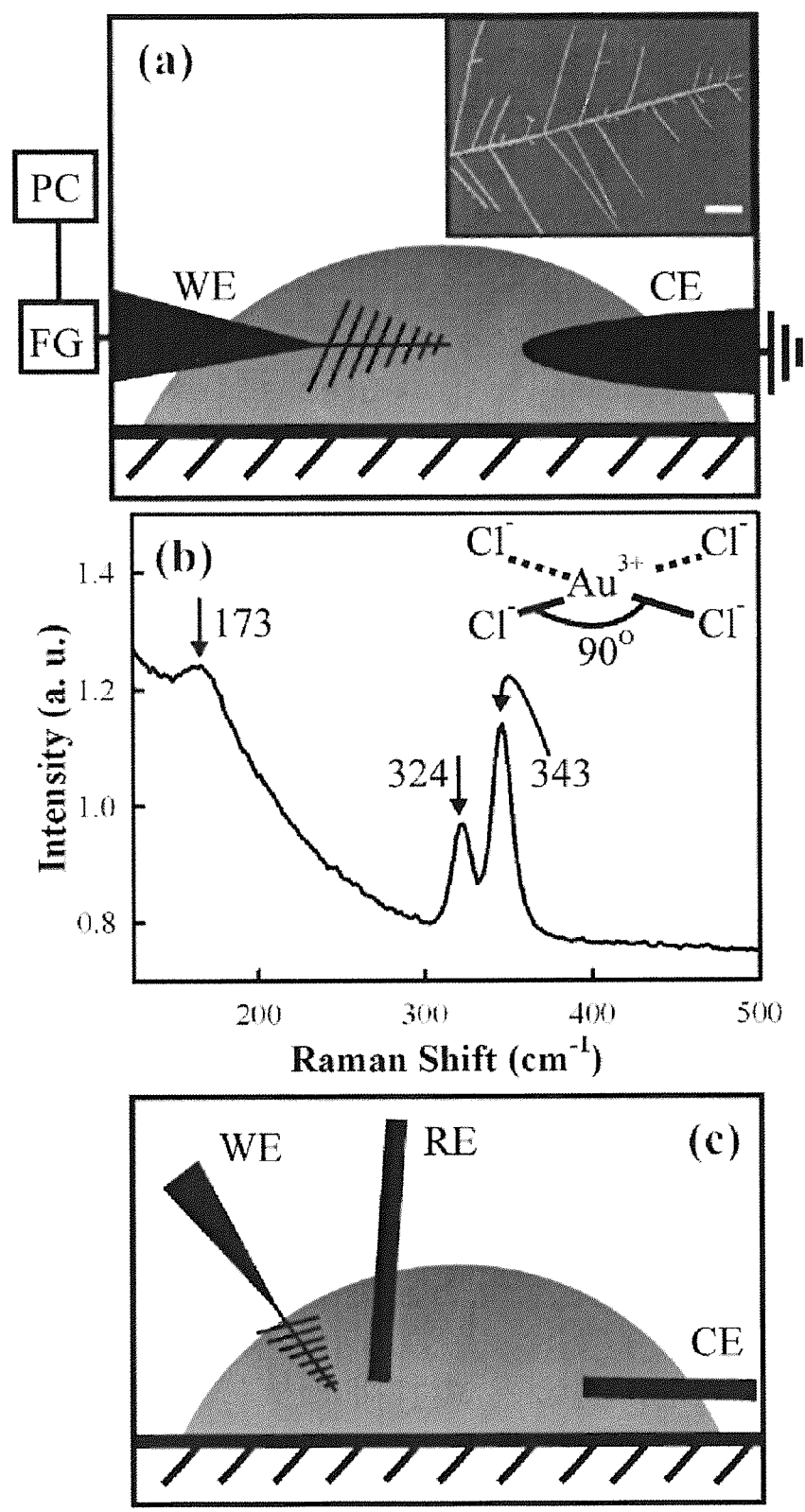
FIG. 17(a) is a schematic depiction of the side-view of the experimental set-up for the growth of gold dendrites described in Example 5.
FIG. 17(b) is a Raman spectrum of 20.0 mM $HAuCl_4$ solution.
FIG. 17(c) is a schematic depicting the 3-electrode set-up used to measure cyclic voltammagrams of gold dendrites.

FIG. 17(a) depicts the set-up for controlling the dendritic growth of gold via the DENA technique. The set-up comprises an electrode pair immersed in aqueous $HAuCl_4$ solution. The counter-electrode (CE) is composed of platinum wire (Kurt J. Lesker, 0.5 mm diameter). The working electrode (WE), which has a sharper tip, comprises a piece of tungsten filament, the tip of which is electro-etched to a ~1 µm radius-of-curvature. FG designates a function generator that is controlled by a personal computer PC via Labview. The inset of FIG. 17(a) is an SEM image of a gold dendrite, scale bar=2 µm. The tungsten filament (SmallParts, 0.2 mm diameter) is mounted in a 3D stage and positioned ~1 µm above a microscope slide that is mounted on an inverted microscope (Leica, IRB). The inter-electrode spacing is adjusted to ~30 µm. A 20 µl aliquot of solution composed of de-ionized (18 MΩ) water and 20.0 mM $HAuCl_4$ (Sigma Aldrich) is deposited across the inter-electrode gap. FIG. 17(b) shows the Raman spectrum of this solution and the inset shows the structure of $Au^{III}Cl_4^-$ ions. The features at 173 $cm^{-1}$, 324 $cm^{-1}$ and 343 $cm^{-1}$ agree well with the known $B_{1g}$ (bend), $B_{2g}$ (asymmetric stretch), and $A_{1g}$ (symmetric stretch) vibrational modes of $Au^{III}Cl_4^-(aq)$, respectively, implying that gold exists predominantly as $Au^{III}Cl_4^-$ in the bulk solution. A function generator (Hewlett Packard, 8116A) was used to apply a square wave voltage signal (±4.0 V, 20.0 MHz) to the working electrode while grounding the counter-electrode to induce growth of the dendrite at the sharper working electrode. Growth occurs within a range of frequencies, from 10.0 MHz to 50.0 MHz A typical gold dendrite is shown in the scanning electron micrograph in the inset of FIG. 17(a). The individual branches, which are thought to originate at random sites along sides of a dendrite due to fluctuations in the diffusion-limited $AuCl_4^-$ deposition rate, have ~60 nm diameters and ~60° branching angles. The applied potential serves to select the growth direction in the lab frame by controlling the direction of $AuCl_4^-$ from solution. The crystallographic growth axis, however, is intrinsic to the crystal (i.e. in the direction of maximum surface tension).

FIG. 17(c) is a schematic depicting the 3-electrode arrangement that was employed to measure cyclic voltammagrams of individual gold dendrites and also of bulk gold samples. WE, RE, and CE designate the working electrode, reference electrode, and counter electrode, respectively. After growing a dendrite from the tip of the working electrode, the $HAuCl_4$ solution was gently withdrawn and replaced with 0.1 M KCl. The working electrode was pulled out of the solution via a translational stage until only the dendrite remained in the solution; hence, the dendrite alone served as the working electrode. This arrangement ensures that only the electrochemistry of the gold dendrite and not that of the tungsten electrode will contribute to the cyclic voltammagram. Care must be taken that the air-water surface tension does not separate the dendrite from its substrate. To attain an I-ΔV profile, a voltage supply steps the potential difference ΔV of the working electrode forward by 25.0 mV relative to an Ag/AgCl reference electrode at a rate of 25.0 mV $s^{-1}$. ΔV is maintained potentiostatically via a Pt counter-electrode during each 1.0 s increment. In a typical cyclic scan, the cross-cell current I that flows into the working-electrode was recorded by stepping ΔV forward in time from 0.0 V to 0.9 V and then back to 0.0 V. In plotting the current, the IUPAC convention was used that a positive (negative) current corresponds to negative (positive) charge flowing into (out of) the working electrode. The plot of I versus ΔV constitutes a cyclic voltammagram. To measure cyclic voltammagrams of bulk gold samples, the same set-up was used except that a segment of 0.5 mm diameter gold wire (Kurt J. Lesker, 99.99% pure) was substituted for the dendrite.

Figure 18:
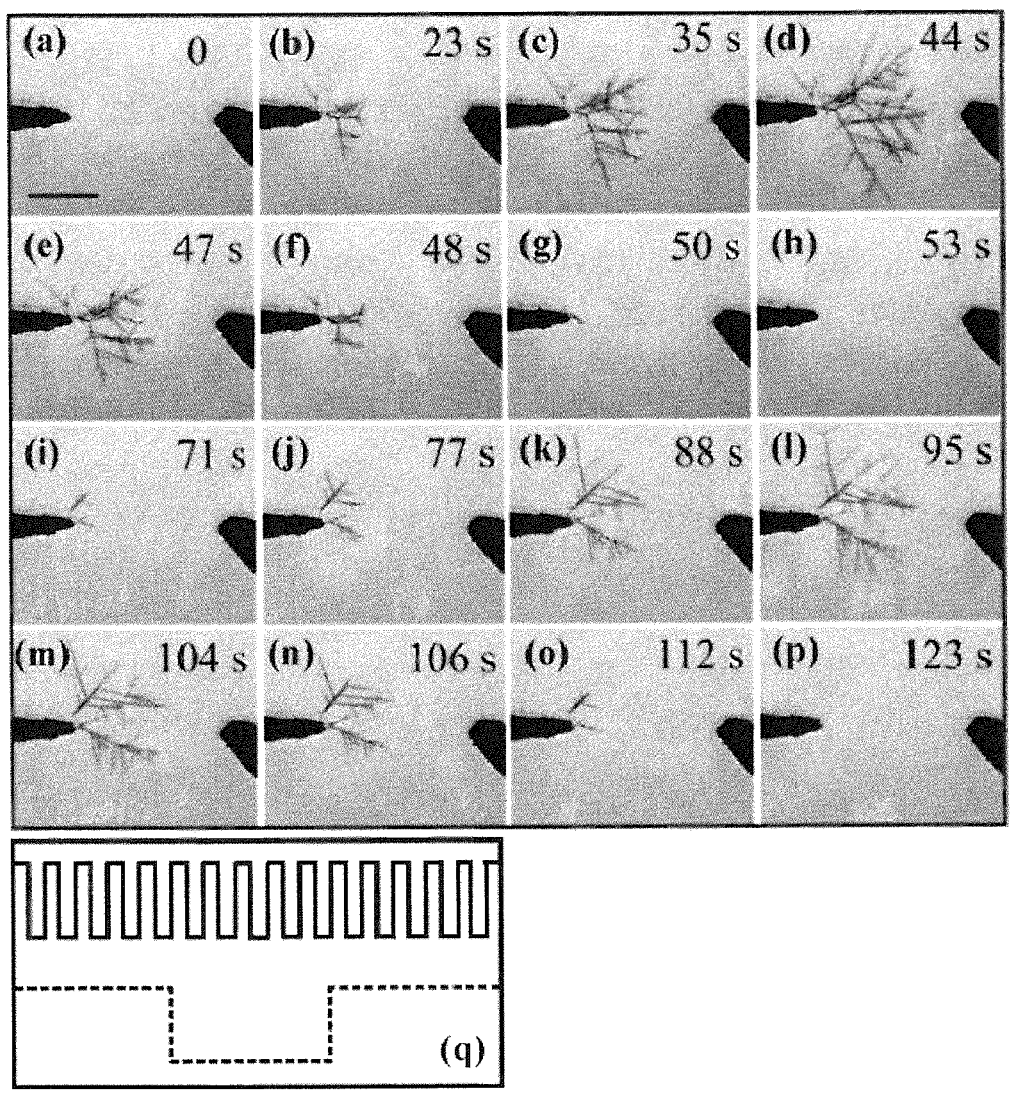
FIGS. 18(a)-(p) are optical images showing growth and dissolution of gold dendrites by twice cycling the frequency of voltage signal (4.0 V amplitude, 50% duty cycle) between 34.0 MHz and 1.0 MHz, panels (a)-(d) and (i)-(l) designate the growth stages, panels (e)-(h) and (m)-(p) designate the dissolution stages.
FIG. 18(q) is a schematic diagram depicting the square-wave signal used to grow (solid line) and dissolve (dashed line) the dendrites.

Full reconfiguration of the dendrite (i.e. growth followed by dissolution) was induced by variation of either the frequency or the duty cycle of the voltage signal. When the frequency f of the voltage signal was used to induce reconfiguration, the amplitude was held constant (usually at 4.0V), the duty cycle is fixed at 50.0%, and the frequency lowered from a high value of greater than 9.0 MHz to a low value of less than 3.0 MHz. An example of frequency-induced dendritic reconfiguration is depicted in FIGS. 18(a)-(p) (scale bar=50 µm). When the duty cycle is used to induce reconfiguration, both the amplitude and the frequency of the voltage signal are held constant. A duty cycle of n means that the duration of the positive half cycle of the voltage signal is n % of its period f[1]. By increasing the duty cycle from less than 50.0% to greater than 50.0%, reconfiguration (i.e. growth followed by dissolution) was induced.

A Raman microscope (iHR550 Horriba-Jobin Yvon spectrometer fiber coupled to a BX-41 Olympus upright microscope) was used to interrogate single gold dendrites immersed in 0.1 M KCl aqueous solution. The microscope was equipped with a 0.8 NA 50× objective and a 633.2 nm HeNe laser (Melles Griot), providing a diffraction-limited laser spot size of ~970 nm. To interrogate a dendrite during electrochemical growth or dissolution, the dendrite-laden tungsten filament and a platinum counter-electrode were mounted on the stage of the Raman microscope and immersed in a drop of the KCl solution. An alternating voltage signal was applied to the dendrite, which served as the working electrode in this cell. The platinum electrode, which was grounded, served as the counter-electrode in this cell.

Theoretical Model

While not intending to limit the scope of the present invention, to describe how both the interfacial and bulk diffusive sub-processes participate in the dendritic reconfiguration process, the following theoretical model is proposed. It is assumed that Schemes (1) [eqn 1(a)-1(c)] and (2) [eqn 2(a)-2(c)] correctly describe the interfacial reduction and oxidation processes that occur when the alternating voltage signal reconfigures a dendritic crystal. This assumption is verified below. To begin, the diffusion of $Au^{III}Cl_4^-$ ions (which are the main source of gold that will crystallize) through the bulk solution to the crystal-solution interface is modeled. For simplicity, the crystal-solution interface is regarded as flat and of constant area A with the gold concentration varying only in the x-direction. Dendritic growth is a diffusion-limited process. The diffusive flux $j_D$ of $Au^{III}Cl_4^-$ toward the interface is:

$$j_D(x,t) = -D\nabla c(x,t) \quad (1)$$

where D is the $Au^{III}Cl_4^-$ diffusion coefficient and c(x,t) is the $Au^{III}Cl_4^-$ concentration at position x in the solution and at time t.

Figure 19:
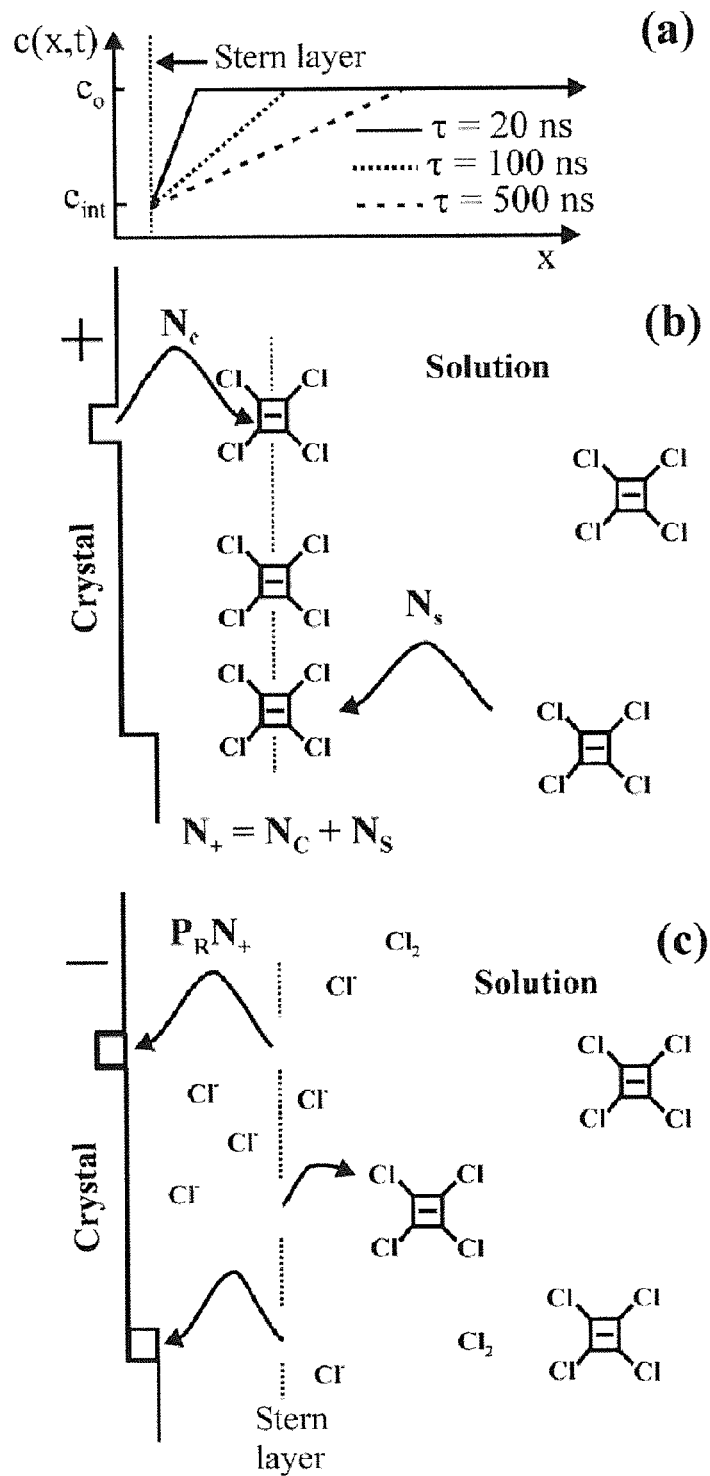
FIG. 19(a) depicts concentration profiles of metallic ions in solution near the crystalline interface after increasing periods of positive bias.
FIG. 19(b) is a schematic representation of the spatial distribution of $Au^{III}Cl_4^-$ ions during a positive half cycle.
FIG. 19(c) is a schematic representation of the distribution of $Au^{III}Cl_4^-$ ions during the subsequent negative half cycle.

In the DENA process, an alternating square wave voltage is applied to solidification front. During each positive half cycle, the concentration of metallic ions in solution evolves in time near the solidification front as governed by the diffusion equation. For simplicity, explicit solution of the time dependent diffusion equation is dispensed with, and the concentration profiles during a positive half cycle with the bi-linear functions are approximated and shown in FIG. 19(a). During a positive half cycle, $Au^{III}Cl_4^-$ diffuses to the solidification front, giving rise to a depletion zone in the bulk. Essentially, the profiles flatten as time increases and the solution near the interface becomes more heavily depleted of $Au^{III}Cl_4^-$. These profiles in FIG. 19(a) imply concentration gradients near the interface of the form:

$$\nabla c(x,t) \approx \frac{\Delta c}{\Delta x(t)} \approx \frac{\Delta c}{\sqrt{2Dt}} \quad (2)$$

where $\Delta c = c_0 - c_{int}$ [see FIG. 19(a)]. In the second equality, Δx was equated to the diffusive root mean square displacement.

When the electrode is positively biased, it is hard for the $Au^{III}$ in the ions to be reduced, so the approaching ions build up Stern and Helmholtz layers adjacent to the electrode. FIG. 19(b) sketches this effect where only the Stern layer is shown, for clarity. Let $N_S$ be the number of $Au^{III}Cl_4^-$ that join the Stern layer via diffusion from the solution during the positive half cycle:

$$N_S = \int_0^\tau j_D(x,t)A\,dt \quad (3)$$
$$= A\Delta c\sqrt{2D\tau}$$

where τ is the duration of a positive half cycle, and equations (1) and (2) were used to arrive at the second equality.

The positive electrode is able to oxidize $Au^{(0)}$ atoms in the crystal in accordance with Scheme (1). As sketched in FIG. 19(b), these gold chloride ions also join the Stern and Helmholtz layers near the interface. The oxidative flux $j_O$ of $Au^{III}Cl_4^-$ to the interfacial Stern layer is taken to be essentially constant during the positive half cycle, as this flux should not depend (much) on the $Au^{III}Cl_4^-$ concentration in solution (which does change during this period). Therefore, the number $N_C$ of $Au^0$ that were oxidized during the positive half cycle is simply:

$$N_C = j_O A\tau \quad (4)$$

Using equations (3) and (4), the total number of ions $N_+$ that join the Stern Layer during a positive half cycle of duration τ is given by the sum of $N_S$ and $N_C$:

$$N_+ = A\Delta c\sqrt{2D\tau} + j_O A\tau. \quad (5)$$

Immediately after the voltage switches negative [see FIG. 19(c)], these $N_+$ gold chloride ions ($Au^{III}Cl_4^-$) still occupy the Stern layer, but have probability $P_R$ of being reduced from $Au^{III}$ to $Au^0$ via Scheme 2. $P_R$ is significant when the electrode is negative, while the oxidation probability is greatly diminished. The number of $Au^{III}$ that are reduced during this step is $P_R N_+$. When τ is adjusted to the critical value $\tau_C$ at which $P_R N_+$ equals $j_O A\tau_C$, the number of $Au^0$ that were oxidized during the positive half cycle, the system is in a steady state—there is neither crystallization nor dissolution:

$$P_R(\sqrt{2D\tau_C}\Delta c + j_O\tau_C) = j_O\tau_C \quad (6)$$

This condition implies an inherent time-scale $\tau_C$ for the positive half cycle duration that demarcates the growth and dissolution modes:

$$\tau_C = \frac{2D\Delta_c^2}{j_O^2}\frac{P_R^2}{(1-P_R)^2} \quad (7)$$

The frequency f of the alternating voltage signal (assuming a 50% duty cycle) is $(2\tau)^{-1}$, so the predicted critical frequency $f_C$ above which growth occurs is $$f_C = \frac{j_0^2}{4D\Delta c^2} \frac{(1-P_R)^2}{P_R^2}. \tag{8}$$

Below this value, dissolution is predicted to occur whereas for frequencies larger than $f_C$, crystallization is expected.

Results

The complete structural reconfiguration of a small number of gold dendrites positioned at the tip of a sharp tungsten filament is illustrated in FIGS. 18(a)-(p). This series of images was collected during a continuous 123 s period when the frequency of the voltage-signal was cycled (two times) between 34.0 MHz and 1.0 MHz. The amplitude and duty cycle were fixed at 4.0 V and 50%, respectively. The 34.0 MHz signal was initiated at t=0 s. Panels (a)-(d) depict the growth of a gold dendrite over the next 44 s. At t=45 s, the frequency was abruptly reduced to 1.0 MHz. Panels (e)-(h) depict the dissolution of the gold dendrite over the subsequent 8 s. Panels (i)-(p) illustrate the next growth-dissolution cycle. This process can be automated and repeated a significant number of times. FIG. 18(q) depicts the square-wave voltage functions used to grow (solid) and dissolve (dashed) the dendrites. Essentially, the growth of gold dendrites is induced by voltage signals of frequency>10.0 MHz; dissolution is induced by voltage signals of frequency<3.0 MHz. Neither behavior is observed for frequencies between 3.0 MHz and 10.0 MHz.

Figure 20:
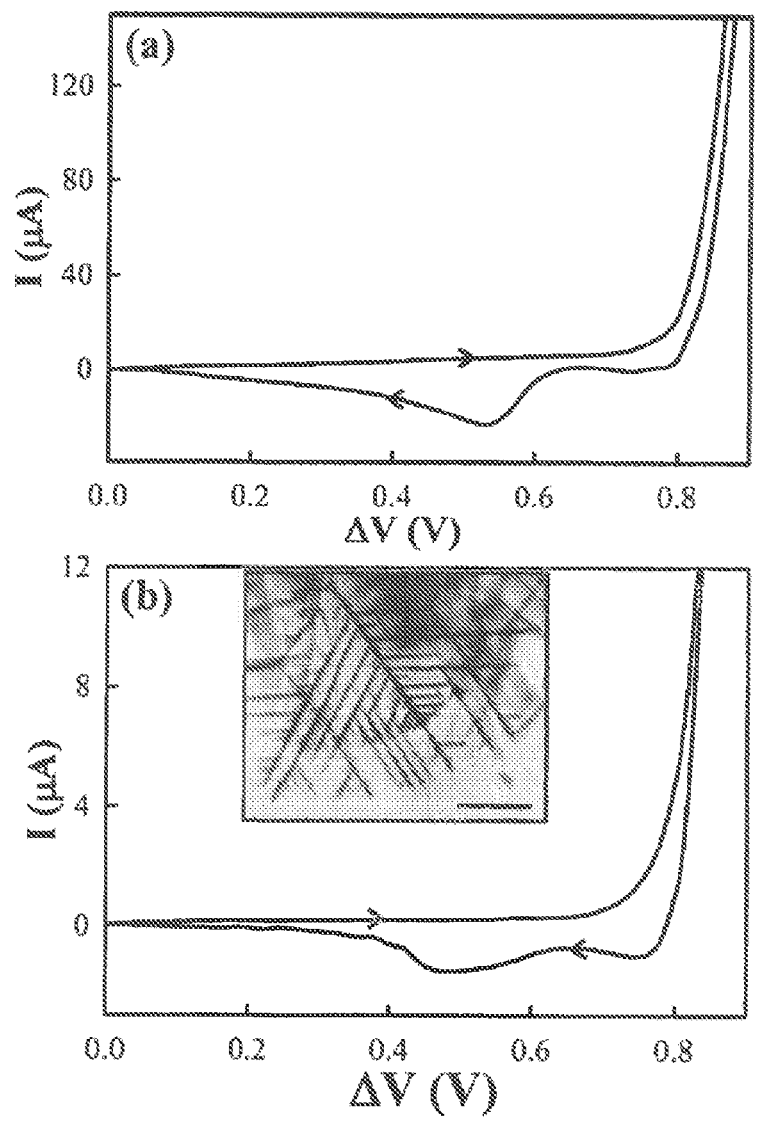
FIG. 20(a) depicts cyclic voltammagrams obtained in 0.1 M KCl with a bulk gold working electrode.
FIG. 20(b) depicts cyclic voltammagrams obtained in 0.1 M KCl with a dendritic gold working electrode.

FIG. 20(a) depicts a cyclic voltammagram of a bulk gold sample. As the potential of the bulk gold working electrode $\Delta V$ is stepped in the positive direction, the current I into the working electrode grows slightly positive (consistent with electrons flowing into the working electrode) and increases in magnitude with a small slope until $\Delta V$~0.80 V. Beyond this point, the current magnitude increases rapidly in the positive direction as $\Delta V$ is stepped further towards 0.90 V. This positive current corresponds to the dissolution of solid $Au^{(0)}$ as it is oxidized to $Au^{III}Cl_4^-$(aq) and $Au^ICl_2^-$(aq). As $\Delta V$ is scanned in the reverse direction, the magnitude of I drops rapidly and flattens out such that little current is measured between 0.8 V and 0.6 V. At ~0.6 V, a negative current becomes evident, peaking at 0.55 V. This negative current corresponds to the deposition of $Au^{(0)}$ on the working electrode as $Au^{III}Cl_4^-$(aq) and possibly also $Au^ICl_2^-$(aq) are reduced to $Au^{(0)}$.

FIG. 20(b) depicts a representative cyclic voltammagram of the gold dendrites shown in the inset. Scan rate=25 mVs$^{-1}$, scale bar=30 μm. (Sign Convention: a positive (negative) current corresponds to negative (positive) charge flowing into (out of) the working electrode). The voltammagram of the dendrite exhibits a forward scan showing a positive current at $\Delta V$~0.75 V that rapidly increases with further voltage-increase; furthermore, this voltammagram exhibits a reverse scan showing a negative current peak at 0.53 V. The voltammagram of bulk gold in FIG. 20(a) shows these same features. This level of agreement implies that dendritic gold undergoes the same redox chemistry under DC voltages as bulk gold. That is, the positive current at voltages above 0.80 V corresponds to the dissolution of Au from the working electrode (i.e. the dendrite), as summarized by Scheme (1); the negative feature at 0.53 V corresponds to the deposition of gold onto the working electrode via the reduction of $Au^{III}Cl_4^-$(aq) and possibly $Au^ICl_2^-$(aq) ions, as summarized by Scheme (2).

Figure 21:
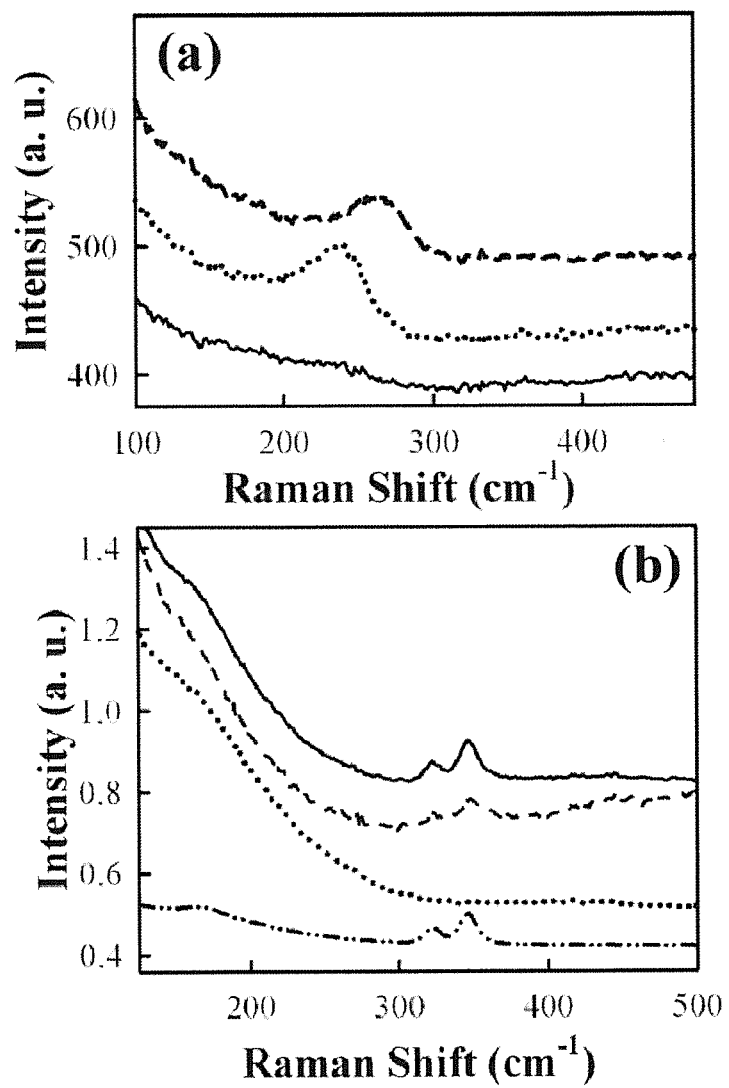
FIG. 21(a) is a Raman spectrum from the surface of gold dendrite in KCl solution with the application of no voltage (solid line), 4.0 V, 500 kHz signal (dotted line), and 6.0 V, 500 kHz signal (dashed line)
FIG. 21(b) is a Raman spectrum of 0.1 M KCl solution while dissolving bulk gold by a 4.0 V, 500 kHz signal (solid line); a Raman spectrum of 0.1 M KCl solution with the application of no voltage to the bulk gold (dotted line); a Raman spectrum for gold-chloride complexes obtained from the surface of residue that was formed by evaporating the post-dissolution solution (dashed line); and for comparison, a Raman spectrum of 20.0 mM $HAuCl_4$ solution (dot-dot-dashed line)

It is possible that the redox-chemistry of gold differs when it is induced by MHz-level voltage signals instead of DC voltage signals. Hence, a Raman microscope has been employed to interrogate the surface of single gold dendrites while they are dissolving under alternating voltages. FIG. 21(a) shows Raman spectra that were collected from a ~0.80 μm$^2$ region of a gold dendrite that was immersed in 0.1 M KCl solution. When no voltage was applied to the dendrite, a featureless spectrum was obtained (solid line). However, the application of a dissolution-inducing 500 kHz voltage-signal (4.0 V amplitude, 50% duty cycle) yielded the spectrum with a single peak at 235 cm$^{-1}$ (dotted line). A voltage-signal having a larger, 6.0 V amplitude (but the same frequency and duty cycle) yielded the spectrum with a single peak at 250 cm$^{-1}$ (dashed line); hence, the larger substrate bias induces a 15 cm$^{-1}$ blue-shift of this spectral feature. The vibrational mode of the adsorbed species $AuCl_{Ad}$ is located between 230 cm$^{-1}$ and 265 cm$^{-1}$ and it blue-shifts with increasing positive substrate bias. This effect occurs because the applied voltage stiffens the Au—Cl bond that forms when a chloride atom binds to a surface gold atom. Substrate bias will not affect a randomly oriented AuCl moiety in solution. This indicates that the 235-250 cm$^{-1}$ feature corresponds to the surface-enhanced Raman detection of $AuCl_{Ad}$ and that the alternating voltage causes the formation $AuCl_{Ad}$ on dendritic gold in accordance with step 1(a) of the bulk dissolution mechanism.

FIG. 21(b) shows Raman spectra that were collected while the microscope was focused ~10 μm to the side of a bulk gold sample. The surrounding solution was 0.1 M KCl, which initially contained no detectable level of $Au^{III}Cl_4^-$. When no voltage was applied to the gold, a featureless spectrum was obtained (dotted profile). However, when a 500 kHz voltage-signal (4.0 V amplitude, 50% duty cycle) was applied, a spectrum with weak shoulder at 173±10 cm$^{-1}$ and peaks at 324±5 cm$^{-1}$ cm$^{-1}$ and 343±5 cm$^{-1}$ was collected (solid profile). These features agree well with the $B_{1g}$ (bend), $B_{2g}$ (asymmetric stretch), and $A_{1g}$ (symmetric stretch) vibrational modes of $Au^{III}C_4^-$(aq), respectively, whose spectrum is shown in FIG. 17(b). The solid profile closely resembles this spectrum. This finding implies that the application of the 500 kHz voltage signal to the gold sample produces $Au^{III}Cl_4^-$(aq) in the region surrounding the sample. Hence, the alternating voltage dissolves gold in accordance with step 1(c) of the established dissolution mechanism.

Figure 22:
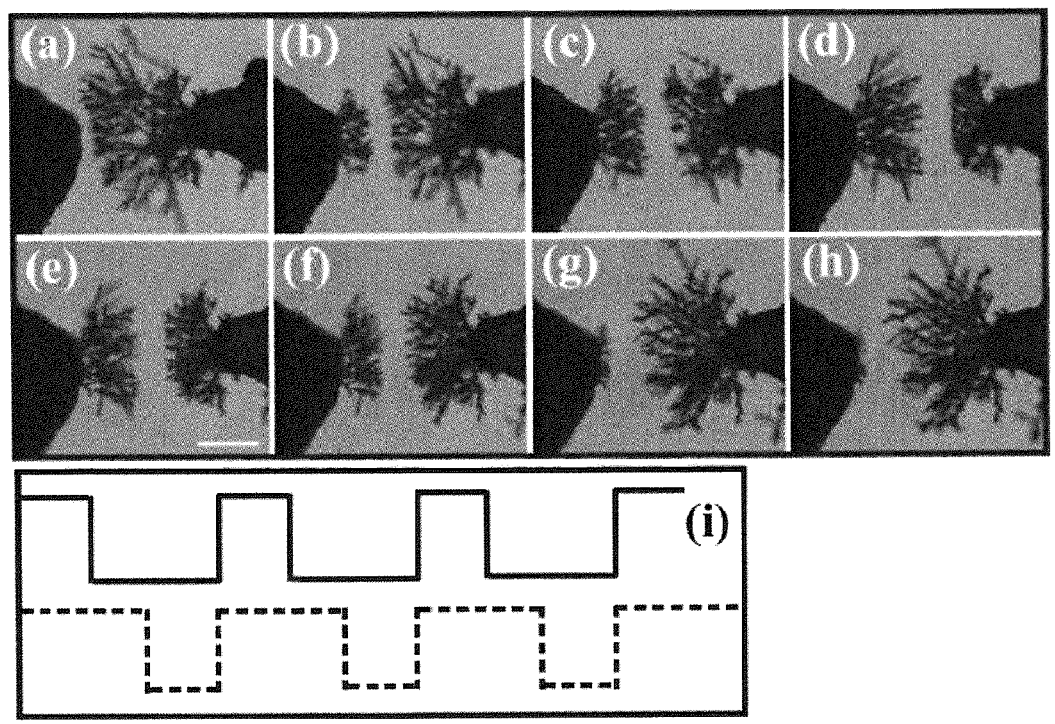
FIGS. 22(a)-(h) are optical micrographs showing growth and dissolution of gold dendrites by cycling the duty cycle of the voltage signal (4.0 V, 6.0 MHz) between 47% and 53%, panels (a)-(d) depict the dissolution of dendrites at right electrode (biased electrode) as induced by 53% duty cycle, and panels (e)-(h) depict the growth of dendrites at right electrode as induced by the 47% duty cycle.
FIG. 22(i) depicts the square-wave voltage functions used to grow (solid) and dissolve (dashed) the dendrites.

The duty cycle of the voltage signal was also found to provide control over the reconfiguration process. FIGS. 22(a)-(h) depict one growth-dissolution cycle of this behavior as induced by switching the duty cycle of the voltage signal (4.0 V, 6.0 MHz) from 47% to 53% once during the 288 s observation period, the scale bar=40 μm. A 6.0 MHz signal was chosen because neither growth nor dissolution is observed when a 6.0 MHz signal with a 50.0% duty cycle was used, allowing any deviation from null behavior to be attributed to the duty cycle. The 53.0% signal was applied to the right electrode at t=0 s. Panels (a)-(d) depict the dissolution of the gold dendrites on that electrode over the next 153 s. At t=−154 s, the duty cycle at the right electrode was abruptly reduced to 47.0%. Panels (e)-(h) depict the growth of gold dendrites at the right electrode over the subsequent 134 s. Because the duty cycle at the left electrode is the complement of that at the right electrode, growth (dissolution) at the left electrode occurs simultaneously with dissolution (growth) at the right electrode. FIG. 22(i) depicts the square-wave voltage functions used to grow (solid) and dissolve (dashed) the dendrites.

Figure 23:
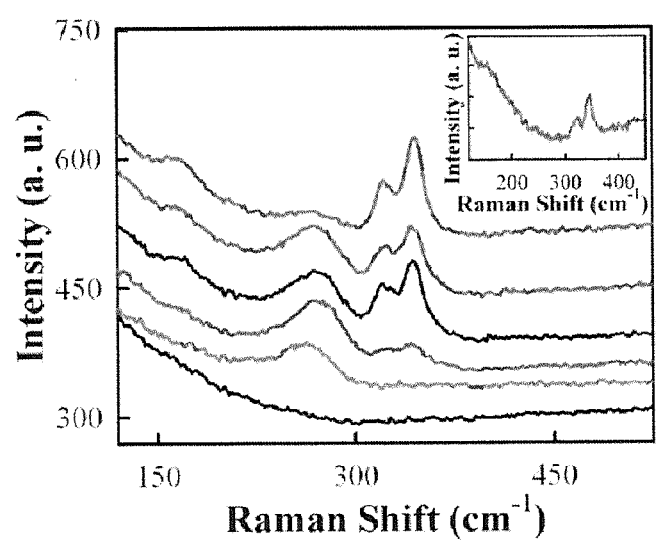
FIG. 23 illustrates Raman spectra from gold surface in 0.1 M KCl solution at 4.0 V, 500 kHz amplitude square signal with 45% duty cycle (bottom), 50% duty cycle ($2^{nd}$ from bottom), 55% duty cycle ($3^{rd}$ from bottom), 60% duty cycle ($3^{rd}$ from top), 65% duty cycle ($2^{nd}$ from top), and 70% duty cycle (top), the inset shows a Raman spectrum of the residual solution following the dissolution of dendrites.

FIG. 23 shows a series of duty-cycle dependent Raman spectra that were collected while the microscope was focused on the interface between a bulk gold wire and a 0.1 M KCl solution. The spectrum collected shortly (~5 s) after applying a 45% voltage signal (500 kHz voltage, 4.0 V amplitude) to the working electrode is featureless (bottom curve). There is little change on stepping the duty cycle up to 50% (2nd from bottom). However, a peak centered at 265 cm$^{-1}$ appears when the duty cycle is increased to 55% (3rd from bottom). As discussed above, this feature likely denotes the adsorbate AuCl$_{Ad}$. Also apparent are weak shoulders at 173 cm$^{-1}$, 324 cm$^{-1}$ and 345 cm$^{-1}$ that denote Au$^{III}$Cl$_4^-$(aq). As the duty cycle is increased further to 60%, 65% and 70% (3rd from top, 2nd from top, and top, respectively), the AuCl$_{Ad}$ feature at 265 cm$^{-1}$ diminishes in intensity while the peaks (at 173 cm$^{-1}$, 324 cm$^{-1}$ and 345 cm$^{-1}$) increase in intensity. These trends suggests that increasing the duty cycle induces the dissolution of solid gold by first reducing Au$^0$ to the intermediate Au$^I$Cl$_{Ad}$, in accordance with step 1(a) of scheme 1. Further increase in the duty cycle causes the gold atom in this species to be reduced to the solvated species Au$^{III}$Cl$_4^-$(aq), in accordance with step 1(b) of scheme (1). The spectrum in the inset was collected from the solution after performing this study, at which point, the solution was faintly yellow, consistent with the presence of Au$^{III}$Cl$_4^-$(aq).

Figure 24:
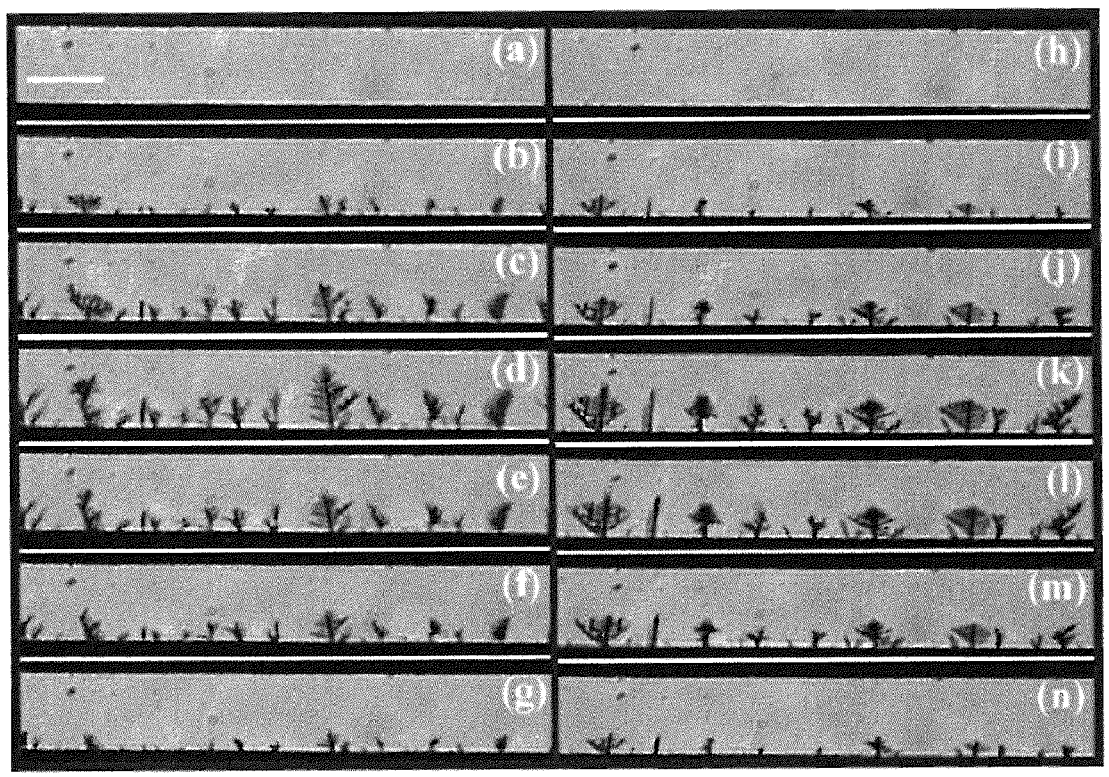
FIGS. 24(a)-(n) are optical micrographs showing growth and dissolution (two cycles) of 1D array of gold dendrites on lithographic substrates that were obtained by twice cycling the frequency between 34.0 MHz and 1.4 MHz, panels (a)-(d) and (h)-(k) depict the growth stage and panels (e)-(g) and (l)-(n) depict the dissolution stage of the dendrites.

It is also possible to produce and reconfigure entire arrays of dendrites that coat electrode surfaces. FIGS. 24(a)-(n) are a series of images depicting the simultaneous reconfiguration of a dozen roughly evenly spaced dendrites that are positioned along a straight 1D lithographic electrode. The horizontal field-of-view in each image is 100 μm, the scale bar=20 μm. Panels (a)-(d) illustrate the growth of these dendrites over a 12 s period, as induced by a voltage-signal (8.0 V, 34 MHz, 50% duty cycle) applied to the (lower) working electrode while grounding the (upper) counter-electrode. Panels (e)-(h) depict the complete dissolution of these dendrites over the following 7 s, as induced by reducing the frequency to 1.4 MHz. Panels (i)-(n) illustrate the subsequent reconfiguration cycle. While the shapes of the individual dendrites differ, their growth and dissolution rates are essentially uniform: at a given time (i.e. panel), the dendrites have common heights. This 1D forest of dendrites extends along the entire 0.225 mm length of the immersed electrode (not shown).

Discussion

Causing dissolution of a crystal is the key step that makes dendritic crystallization a reconfigurable process. This example shows that changes in the MHz-level frequencies of voltages that are applied to the dendrites induce their dissolution. To better understand how this process occurs, the redox chemistry of the crystal-solution interface during dissolution has been characterized. Close similarity between the cyclic voltammagrams of bulk and dendritic gold (FIGS. 20(a) and (b), respectively) imply that both materials grow and dissolve under DC voltages via the same chemical steps (Schemes 1 and 2). To interrogate the reconfiguration chemistry under alternating voltages, Raman microscopy was employed. These studies have established that the adsorbate AuCl$_{Ad}$ forms on the dendrite-surface when <3.0 MHz voltage signals, which induce dissolution, are applied to the dendrite (FIG. 21(a)). This finding is in agreement with step 1(a) of the bulk dissolution mechanism (Scheme 1). A Raman signal indicating that Au$^{III}$Cl$_4^-$(aq) is produced when this voltage is applied to the gold samples was also observed. This finding is in accordance with step 1(c) of the bulk dissolution mechanism. Structural reconfiguration of dendritic gold is also induced by changes in the duty cycle of the voltage-signals that are applied to the dendrites. As discussed above, increasing (decreasing) the duty cycle to values greater (less) than 50.0% causes the dendrite to dissolve (grow) (FIGS. 22(a)-(h)). Raman analysis indicates that scheme (1) accurately describes how dissolution occurs when duty cycles = 50.0% are applied (FIG. 23). Taken together, these observations indicate that the same dissolution mechanism that occurs under DC voltages (and which is well understood) provides an accurate description of the dissolution portion of the dendrite reconfiguration mechanism.

This analysis provides confidence that Schemes (1) and (2) accurately describe the interfacial atom-joining and atom-leaving processes that occurs during dendritic reconfiguration and, thereby, validates the use of these schemes in the theoretical formulation presented above. This theory predicts a critical frequency $f_C$ (equation (8)) for the alternating voltage, above which there is growth and below which there is dissolution. The following values were used in equation (8) in order to compute the critical frequency. An estimate for the diffusivity D is calculated via application of the Stokes-Einstein relation to an Au$^{III}$Cl$_4^-$ ion of radius a~4.5×10$^{-10}$ m in aqueous solution of viscosity 1×10$^{-3}$ kg m$^{-1}$ s$^{-1}$ having thermal energy $k_B T$~4.1×10$^{-21}$ J: D~$k_B T/(6\pi\eta a)$=4.8×10$^{-10}$ m s$^{-2}$; if it is assumed that the interfacial concentration of Au$^{III}$Cl$_4^-$ is ~½ the bulk concentration of 20 mM, then Δc~10 mM=0.5×10$^{25}$ m$^{-3}$. An estimate for oxidative flux $j_O$ is obtained through the observation that a typical gold dendrite of number density ρ~6×10$^{-28}$ m$^{-3}$ dissolves at a rate of $v_D$~5 μm s$^{-1}$; thus $j_O$~$\rho v_D$=3.0×10$^{23}$ m$^{-2}$ s$^{-1}$. The reduction probability during the negative half cycle ($P_R$) must lie between 0 and 1. Here, a value of $P_R$~0.5 was assumed. This number seems reasonable as $P_R$ is expected to be significant due to the availability of electrons on the negative dendrite (with which to reduce Au$^{III}$Cl$_4^-$), but should not be as high as unity due to electrostatic repulsion between the electrode and Au$^{III}$Cl$_4^-$. Substitution of these values into (8) yields $f_C$~1.8 MHz. Experimentally, the critical frequency was observed to be ~3.0 MHz, so prediction and observation are in reasonable agreement. Qualitative agreement is all that should be expected of this theory, given its approximate treatment of the diffusion equation. Nevertheless, this approach addresses the effects of both the interfacial chemistry and the bulk diffusion of Au$^{III}$Cl$_4^-$ to illustrate how imbalance between the interfacial and diffusive rates causes either growth or dissolution of dendritic crystals.

This theory also provides an explanation for why variation of the duty cycle induces reconfiguration. Increasing the duty cycle lengthens the duration that the dendrite is positively biased relative to its duration of negative bias. According to the theory, such a change will enhance the extent of dissolution during a complete voltage cycle and reduce the extent of reduction (i.e. deposition); hence, dendrites are expected to dissolve under duty cycles>50.0%, as observed. Conversely, reducing the duty cycle shortens the duration that the dendrite is positively biased. This change will retard the extent of dissolution during a complete cycle and enhance the extent of deposition. Hence, dendrites are expected to grow when the duty cycle is less than 50.0%, as observed.

As an extension of the basic reconfiguration-process that individual dendrites exhibit, the reconfiguration of macroscopic arrays of dendrites has been demonstrated. FIG. 23 illustrates the on-command growth and dissolution of 1D forests of dendrites that extend along the entire (0.25 mm) length of an immersed electrode. This capability may be extended to produce regenerative 2D dendritic arrays.

CONCLUSIONS

This example presents an electrochemical method for inducing the complete structural reconfiguration of metallic nano-dendrites. Essentially, a dendrite, or an array of dendrites, has been caused to grow, dissolve, and grow again in an on-command and repeatable manner. The observations strongly suggest that the alternating voltages used in the DENA technique cause gold nano-dendrites to grow and dissolve by the same reduction and oxidation mechanisms that bulk gold samples exhibit under DC voltages. A simple theoretical model that accounts for both of these interfacial chemical processes as well as the bulk diffusion of $Au^{III}Cl_4^-$ through the solution succeeds, at least on a semi-quantitative-level, in describing how the dendritic reconfiguration mechanism works. Essentially, the frequency and the duty cycle of the alternating voltage signal control the imbalance between interfacial and diffusive processes to cause either growth or dissolution of dendritic crystals.

Production of fully reconfigurable 2D dendritic arrays may provide an innovative way to coat surfaces with nano-structured dendrites in a reconfigurable manner. DENA provides control over both the overall size and the branch-diameter of a dendrite, thereby providing both micro- and nanoscale control; hence, 2D arrays of such structures hold promise as surface modifications that provide reconfigurable or self-healing wettability and adhesion control of the Baxter-Cassie type. As a reasonably wide range of metals undergoes dendritic solidification—not just gold, new strategies for anodic protection of metallic surfaces immersed in corrosive environments, such as seawater, become possible. One example is the deposition of 2D forests of Mg or Zn dendrites onto immersed surfaces in order to serve as rechargeable sacrificial anodes that would be inexpensive and widely available. Finally, given that the plasmonic resonances of the nano-dendrites will alter the color and specular reflectance of a surface that is coated with such an array, variation of the optical properties of the surface may also be achieved.

We claim:

1. A hybrid AFM cantilever comprising an AFM cantilever having a tip having a free end that is not permanently attached to a substrate, at least a portion of said tip being gold plated, and a nanowire extending from said gold plated portion of said free end of said tip of said AFM cantilever, wherein said nanowire comprises a poly-3,4-ethylenedioxy-thiophene (PEDOT).

2. The hybrid AFM cantilever according to claim 1, wherein said gold plating has a thickness of about 10 nm to about 500 nm.

3. The hybrid AFM cantilever according to claim 1, wherein said nanowire has a length of about 1 μm to about 200 μm.

4. The hybrid AFM cantilever according to claim 1, wherein said nanowire has a mean radius of about 30 nm to about 800 nm.

5. The hybrid AFM cantilever according to claim 4, wherein said nanowire has a radial variation of up to 80% of the mean radius.

6. The hybrid AFM cantilever according to claim 1, wherein said nanowire comprises a first end and a second end, said nanowire first end being in contact with said gold plated portion of said free end of said tip of said AFM cantilever, wherein said nanowire first end has a mean radius $r_1$ and said second end has a mean radius $r_2$, wherein the ratio of $r_2$ to $r_1$ is at least 1.1:1 and not more than 50:1.

7. The hybrid AFM cantilever according to claim 1, wherein said nanowire is substantially rectilinear.

8. A method of measuring cellular forces exerted by a cell, said method comprising the steps of:
   a) providing an apparatus comprising
      an AFM cantilever having a tip having a free end that is not permanently attached to a substrate, said tip being at least partially coated with gold, and a nanowire extending from said free end of said at least partially gold-coated tip of said AFM cantilever, wherein said nanowire comprises a poly-3,4-ethylenedioxy-thiophene (PEDOT);
   b) causing a cell to come into contact with said nanowire, said cell causing said nanowire to be displaced from its normal position;
   c) imaging said cell in contact with said nanowire during displacement thereof; and
   d) measuring the distance that said nanowire is displaced during contact with said cell.

9. A method of manipulating one or more cells, said method comprising:
   a) providing the apparatus of claim 1; and
   b) contacting said one or more cells with said nanowire.

* * * * *